(12) United States Patent
Diankov et al.

(10) Patent No.: US 11,472,640 B2
(45) Date of Patent: *Oct. 18, 2022

(54) ROBOTIC SYSTEM FOR PALLETIZING PACKAGES USING REAL-TIME PLACEMENT SIMULATION

(71) Applicant: MUJIN, Inc., Tokyo (JP)

(72) Inventors: Rosen Nikolaev Diankov, Tokyo (JP); Denys Kanunikov, Tokyo (JP)

(73) Assignee: MUJIN, Inc., Tokyo (JP)

( * ) Notice: Subject to any disclaimer, the term of this patent is extended or adjusted under 35 U.S.C. 154(b) by 266 days.

This patent is subject to a terminal disclaimer.

(21) Appl. No.: 16/804,853

(22) Filed: Feb. 28, 2020

(65) Prior Publication Data

US 2020/0377315 A1     Dec. 3, 2020

Related U.S. Application Data

(63) Continuation of application No. 16/428,870, filed on May 31, 2019, now Pat. No. 10,647,528.

(51) Int. Cl.
| | | |
|---|---|---|
| *B65G 57/22* | (2006.01) | |
| *B65G 57/02* | (2006.01) | |
| *B65G 57/24* | (2006.01) | |
| *B65G 61/00* | (2006.01) | |
| *B25J 9/00* | (2006.01) | |

(Continued)

(52) U.S. Cl.
CPC ............ *B65G 57/22* (2013.01); *B25J 9/0093* (2013.01); *B25J 9/1661* (2013.01); *B25J 9/1664* (2013.01); *B65G 47/90* (2013.01); *B65G 57/02* (2013.01); *B65G 57/24* (2013.01); *B65G 61/00* (2013.01)

(58) Field of Classification Search
CPC ......... B65G 57/22; B65G 61/00; B65G 57/02
See application file for complete search history.

(56) References Cited

U.S. PATENT DOCUMENTS 3,586,176 A * 6/1971 Rackman ............... B65G 57/22
                                                                                 901/3
4,641,271 A    2/1987 Konishi et al.
(Continued)

FOREIGN PATENT DOCUMENTS

| CA | 2472434 A1 | 10/2005 |
|---|---|---|
| CN | 1277591 A | 12/2000 |

(Continued)

OTHER PUBLICATIONS

KIPO Notice of Allowance dated Sep. 5, 2021 for Korean patent application No. 9-5-2021-062620915, 2 pages.

(Continued)

*Primary Examiner* — Thomas Randazzo
(74) *Attorney, Agent, or Firm* — Perkins Coie LLP

(57) ABSTRACT

A robotic system for arranging packages at a destination in a specified arrangement. The robotic system processes incoming packages, stores the packages in a temporary storage area, executes a simulate function to generate or update a simulated stacking plan, determines the occurrence of a palletizing trigger, and places the packages on the pallet according to the simulated stacking plan upon determining the occurrence of the palletizing trigger. The palletizing trigger can be one of a time limit trigger, a uniform layer trigger, a storage capacity trigger, or receiving a placement initiation command.

20 Claims, 12 Drawing Sheets

(51) Int. Cl.
 *B25J 9/16* (2006.01)
 *B65G 47/90* (2006.01)

(56) References Cited

U.S. PATENT DOCUMENTS

| | | | |
|---|---|---|---|
| 4,676,050 A | | 6/1987 | Odenthal |
| 4,692,876 A | * | 9/1987 | Tenma .................... G06Q 10/08 |
| | | | 901/7 |
| 5,079,699 A | | 1/1992 | Tuy et al. |
| 5,175,692 A | * | 12/1992 | Mazouz ................ B65G 61/00 |
| | | | 901/7 |
| 5,501,571 A | * | 3/1996 | Van Durrett ........... B65G 61/00 |
| | | | 414/21 |
| 5,908,283 A | * | 6/1999 | Huang ................... B65G 61/00 |
| | | | 414/21 |
| 6,055,462 A | * | 4/2000 | Sato ....................... B25J 9/1687 |
| | | | 700/217 |
| 7,266,422 B1 | * | 9/2007 | DeMotte et al. ...... B25J 9/1687 |
| | | | 414/801 |
| 8,290,617 B2 | * | 10/2012 | Ruge ..................... B65G 61/00 |
| | | | 700/217 |
| 9,089,969 B1 | | 7/2015 | Theobald |
| 9,102,055 B1 | * | 8/2015 | Konolige ............... G06V 10/42 |
| 9,205,558 B1 | | 12/2015 | Zevenbergen et al. |
| 9,205,562 B1 | | 12/2015 | Konolige et al. |
| 9,315,344 B1 | * | 4/2016 | Lehmann ............... G06Q 10/08 |
| 9,393,693 B1 | | 7/2016 | Kalakrishnan et al. |
| 9,424,470 B1 | | 8/2016 | Hinterstoisser |
| 9,457,477 B1 | | 10/2016 | Rublee et al. |
| 9,457,970 B1 | | 10/2016 | Zevenbergen et al. |
| 9,688,489 B1 | | 6/2017 | Zevenbergen et al. |
| 9,714,145 B1 | | 7/2017 | Lehmann |
| 9,866,815 B2 | | 1/2018 | Vrcelj et al. |
| 9,926,138 B1 | | 3/2018 | Brazeau |
| 10,124,489 B2 | | 11/2018 | Chitta |
| 10,252,870 B2 | | 4/2019 | Kimoto et al. |
| 10,335,947 B1 | | 7/2019 | Diankov et al. |
| 10,549,928 B1 | | 2/2020 | Chavez et al. |
| 10,618,172 B1 | | 4/2020 | Diankov et al. |
| 10,647,528 B1 | * | 5/2020 | Diankov ................ B65G 61/00 |
| 10,679,379 B1 | | 6/2020 | Diankov et al. |
| 10,696,493 B1 | | 6/2020 | Diankov et al. |
| 10,696,494 B1 | | 6/2020 | Diankov et al. |
| 10,953,549 B2 | | 3/2021 | Diankov et al. |
| 11,077,554 B2 | | 8/2021 | Arase et al. |
| 11,319,166 B2 | | 5/2022 | Diankov et al. |
| 2002/0057838 A1 | | 5/2002 | Steger |
| 2003/0110102 A1 | | 6/2003 | Chien et al. |
| 2004/0120600 A1 | | 6/2004 | Cho et al. |
| 2005/0246056 A1 | | 11/2005 | Marks et al. |
| 2008/0131255 A1 | | 6/2008 | Hessler |
| 2008/0273801 A1 | | 11/2008 | Podilchuk |
| 2009/0069939 A1 | * | 3/2009 | Nagatsuka ............. B25J 9/1671 |
| | | | 901/50 |
| 2009/0138121 A1 | | 5/2009 | Wicks et al. |
| 2010/0178149 A1 | * | 7/2010 | Fritzsche ............... B65G 57/22 |
| | | | 414/789.5 |
| 2010/0222915 A1 | * | 9/2010 | Kuehnemann ......... B65G 57/00 |
| | | | 706/14 |
| 2010/0249989 A1 | | 9/2010 | Baldes et al. |
| 2011/0013809 A1 | | 1/2011 | Abe |
| 2011/0122231 A1 | | 5/2011 | Fujieda et al. |
| 2013/0163879 A1 | | 6/2013 | Katz et al. |
| 2013/0282165 A1 | | 10/2013 | Pankratov et al. |
| 2013/0345870 A1 | | 12/2013 | Buehler et al. |
| 2014/0180479 A1 | | 6/2014 | Argue et al. |
| 2014/0374216 A1 | | 12/2014 | Pierson et al. |
| 2015/0073588 A1 | * | 3/2015 | Priebe ................... B65G 57/00 |
| | | | 700/217 |
| 2015/0166272 A1 | * | 6/2015 | Pankratov ............. B65G 61/00 |
| | | | 700/217 |
| 2016/0016311 A1 | | 1/2016 | Konolige et al. |
| 2016/0063309 A1 | | 3/2016 | Konolige et al. |
| 2016/0288330 A1 | | 10/2016 | Konolige et al. |
| 2016/0371850 A1 | | 12/2016 | Kwon et al. |
| 2017/0080566 A1 | | 3/2017 | Stubbs et al. |
| 2017/0134680 A1 | | 5/2017 | Zhong et al. |
| 2017/0246744 A1 | | 8/2017 | Chitta et al. |
| 2017/0267467 A1 | | 9/2017 | Kimoto et al. |
| 2018/0060765 A1 | * | 3/2018 | Hance .................... B65G 57/02 |
| 2018/0065818 A1 | | 3/2018 | Gondoh et al. |
| 2018/0304468 A1 | | 10/2018 | Holz |
| 2018/0312346 A1 | * | 11/2018 | Klotz ..................... B65G 47/52 |
| 2019/0039237 A1 | * | 2/2019 | Nakashima ............ B25J 9/1669 |
| 2019/0061151 A1 | | 2/2019 | Namiki |
| 2019/0114250 A1 | | 4/2019 | Pugh |
| 2019/0143504 A1 | * | 5/2019 | Kimoto .................. B25J 9/163 |
| | | | 700/245 |
| 2019/0193956 A1 | | 6/2019 | Morland et al. |
| 2019/0197695 A1 | | 6/2019 | Itakura |
| 2020/0376662 A1 | | 12/2020 | Arase et al. |
| 2020/0376670 A1 | | 12/2020 | Diankov et al. |
| 2020/0377311 A1 | | 12/2020 | Diankov et al. |
| 2020/0377312 A1 | | 12/2020 | Diankov et al. |
| 2020/0380722 A1 | | 12/2020 | Diankov et al. |
| 2021/0237274 A1 | | 8/2021 | Diankov et al. |
| 2021/0260762 A1 | | 8/2021 | Arase et al. |

FOREIGN PATENT DOCUMENTS

| | | | |
|---|---|---|---|
| CN | 101145051 A | | 3/2008 |
| CN | 201804260 U | | 4/2011 |
| CN | 102556523 A | | 7/2012 |
| CN | 102725703 B | | 10/2012 |
| CN | 103350908 A | | 10/2013 |
| CN | 103640729 A | | 3/2014 |
| CN | 103988214 B | | 8/2014 |
| CN | 105691717 A | | 6/2016 |
| CN | 108064197 A | | 5/2018 |
| CN | 207374734 U | | 5/2018 |
| CN | 108748136 A | | 11/2018 |
| CN | 108776879 A | | 11/2018 |
| CN | 109132313 A | | 1/2019 |
| CN | 109353833 A | | 2/2019 |
| CN | 109359739 A | | 2/2019 |
| CN | 109382822 A | | 2/2019 |
| CN | 107885901 B | | 2/2020 |
| CN | 112009810 A | | 12/2020 |
| DE | 69221658 T2 | | 9/1997 |
| DE | 10352279 A1 | | 6/2005 |
| DE | 69730758 T2 | | 9/2005 |
| DE | 102009011294 A1 | | 9/2010 |
| DE | 102009011300 A1 | | 9/2010 |
| DE | 102014005758 B4 | | 10/2014 |
| DE | 102007001263 B4 | | 7/2015 |
| DE | 102016013497 A1 | | 5/2017 |
| DE | 102017122361 A1 | | 3/2018 |
| DE | 112011105151 B4 | | 9/2018 |
| DE | 102018006465 A1 | | 2/2019 |
| DE | 2018008744 A1 | | 5/2019 |
| EP | 0507375 A2 | | 8/1997 |
| EP | 2314425 A2 | | 4/2011 |
| EP | 3104313 A1 | | 12/2016 |
| EP | 3437807 A1 | | 2/2019 |
| JP | 62019963 A | | 1/1987 |
| JP | H03162320 A | | 7/1991 |
| JP | H04201926 A | | 7/1992 |
| JP | H08118274 A | | 5/1996 |
| JP | 2000168958 A | | 6/2000 |
| JP | 2002154616 A | | 5/2002 |
| JP | 2002154620 A | | 5/2002 |
| JP | 2003104563 A | | 4/2003 |
| JP | 2003335417 A | | 11/2003 |
| JP | 3586639 B2 | | 11/2004 |
| JP | 2004307111 A | | 11/2004 |
| JP | 2005089067 A | * | 4/2005 ............. B65G 57/02 |
| JP | 2005089067 A | | 4/2005 |
| JP | 2007291451 A | | 11/2007 |
| JP | 2017094428 A1 | | 6/2017 |
| JP | 2018008824 A | | 1/2018 |
| JP | 2018052691 A | | 4/2018 |
| JP | 2018136896 A | | 8/2018 |
| JP | 2018167950 A | | 11/2018 |

(56) References Cited

FOREIGN PATENT DOCUMENTS

| | | |
|---|---|---|
| JP | 2019025618 A | 2/2019 |
| JP | 2019085213 A | 6/2019 |
| WO | 2017018113 A1 | 2/2017 |
| WO | 2018194765 | 10/2018 |

OTHER PUBLICATIONS

Non-Final Office Action dated Mar. 28, 2022 for U.S. Appl. No. 16/858,536, filed Apr. 24, 2020, 49 pages.
Office Action dated Dec. 6, 2021 for German patent application No. 102019009189.2, 6 pages.
KIPO Notice of Allowance dated Mar. 23, 2022 for Korean patent application No. 9-5-2022-022045553, 4 pages.
KIPO Notice of Allowance dated Mar. 29, 2022 for Korean patent application No. 9-5-2022-023805806, 4 pages.
Notice of Allowance dated Jan. 12, 2021 for U.S. Appl. No. 16/886,734, filed May 28, 2020, 13 pages.
CIPO Office Action dated Dec. 28, 2020 for Chinese patent application No. 202010221047.6, 5 pages.
JPO Office Action dated Apr. 2, 2020 for Japanese patent application No. 2019-168905, 2 pages.
JPO Office Action dated Mar. 12, 2020 for Japanese patent application No. 2019-170230, 2 pages.
JPO Office Action dated Apr. 8, 2020 for Japanese patent application No. 2019-169752, 3 pages.
Notice of Allowance dated Oct. 23, 2020 for U.S. Appl. No. 16/802,451, filed Feb. 26, 2020, 10 pages.
CIPO Notice to Grant dated Mar. 2, 2021 for Chinese patent application No. 202010221047.6, 4 pages.
JPO Notice to Grant dated Apr. 14, 2020 for Japanese patent application No. 2019-168905, 3 pages.
JPO Notice to Grant dated Apr. 2, 2020 for Japanese patent application No. 2019-170230, 3 pages.
CIPO Office Action dated Dec. 28, 2020 for Chinese patent application No. 202010221046.1, 6 pages.
CIPO Office Action dated Mar. 1, 2021 for Chinese patent application No. 202010221046.1, 5 pages.
CIPO Office Action dated Jan. 18, 2021 for Chinese patent application No. 202010221092.1, 9 pages.
CIPO Notice to Grant dated Mar. 3, 2021 for Chinese patent application No. 202010221092.1, 4 pages.
JPO Notice to Grant dated Jun. 5, 2020 for Japanese patent application No. 2019-169752, 3 pages.
Notice of Allowance dated Feb. 9, 2021 for U.S. Appl. No. 16/802,451, filed Feb. 26, 2020, 13 pages.
CIPO Office Action dated Jan. 5, 2021 for Chinese patent application No. 202010221015.6, 6 pages.
CIPO Notice to Grant dated Mar. 2, 2021 for Chinese patent application No. 202010221015.6, 4 pages.
JPO Notice to Grant dated Feb. 10, 2020 for Japanese patent application No. 2019-169842, 3 pages.
JPO Office Action dated Jan. 21, 2020 for Japanese patent application No. 2019-169842, 5 pages.
CIPO Office Action dated Jan. 13, 2021 for Chinese patent application No. 202010205099.4, 6 pages.
CIPO Notice to Grant dated Feb. 20, 2021 for Chinese patent application No. 202010205099.4, 4 pages.
JPO Notice to Grant dated Jan. 21, 2020 for Japanese patent application No. 2019-169237, 3 pages.
Non-Final Office Action dated Sep. 28, 2020 for U.S. Appl. No. 16/886,734, filed May 28, 2020, 32 pages.
CIPO Notice to Grant dated Apr. 2, 2021 for Chinese patent application No. 202010221046.1, 4 pages.

Office Action dated May 4, 2020 for German patent application No. 102019130043.6, 8 pages.
Decision to Grant dated Sep. 7, 2020 for German patent application No. 102019130043.6, 6 pages.
Non-Final Office Action dated Sep. 15, 2020 for U.S. Appl. No. 16/802,451, filed Feb. 26, 2020, 25 pages.
Non-Final Office Action dated Jul. 25, 2019 for U.S. Appl. No. 16/428,645, filed May 31, 2019, 8 pages.
Final Office Action dated Dec. 2, 2019 for U.S. Appl. No. 16/428,645, filed May 31, 2019, 8 pages.
Non-Final Office Action dated Sep. 11, 2019 for U.S. Appl. No. 16/428,714, filed May 31, 2019, 30 pages.
Notice of Allowance dated Aug. 29, 2019 for U.S. Appl. No. 16/428,809, filed May 31, 2019, 6 pages.
Notice of Allowance dated Dec. 11, 2019 for U.S. Appl. No. 16/428,809, filed May 31, 2019, 13 pages.
Non-Final Office Action dated Jul. 31, 2019 for U.S. Appl. No. 16/428,843, filed May 31, 2019, 15 pages.
Final Office Action dated Dec. 2, 2019 for U.S. Appl. No. 16/428,843, filed May 31, 2019, 7 pages.
Non-Final Office Action dated Aug. 2, 2019 for U.S. Appl. No. 16/428,870, filed May 31, 2019, 21 pages.
Notice of Allowance dated Jan. 24, 2020 for U.S. Appl. No. 16/428,870, filed May 31, 2019, 17 pages.
U.S. Appl. No. 16/428,645, filed May 31, 2019, Inventors: Rosen Nikolaev Diankov and Denys Kanunikov, Applicant: MUJIN, Inc.
U.S. Appl. No. 16/428,714, filed May 31, 2019, Inventors: Rosen Nikolaev Diankov and Denys Kanunikov, Applicant: MUJIN, Inc.
U.S. Appl. No. 16/428,809, filed May 31, 2019, Inventors: Rosen Nikolaev Diankov and Denys Kanunikov, Applicant: MUJIN, Inc.
U.S. Appl. No. 16/428,843, filed May 31, 2019, Inventors: Rosen Nikolaev Diankov and Denys Kanunikov, Applicant: MUJIN, Inc.
U.S. Appl. No. 16/428,870, filed May 31, 2019, Inventors: Rosen Nikolaev Diankov and Denys Kanunikov, Applicant: MUJIN, Inc.
Office Action dated Jul. 1, 2021 for German patent application No. 102019130635.3, 6 pages.
Notice of Allowance dated Mar. 11, 2020 for U.S. Appl. No. 16/428,645, filed May 31, 2019, 10 pages.
Notice of Allowance dated Mar. 12, 2020 for U.S. Appl. No. 16/428,714, filed May 31, 2019, 30 pages.
Notice of Allowance dated Mar. 12, 2020 for U.S. Appl. No. 16/428,843, filed May 31, 2019, 10 pages.
U.S. Appl. No. 15/931,530, filed May 13, 2020, Inventors: Rosen Nikolaev Diankov and Denys Kanunikov, Applicant: MUJIN, Inc.
U.S. Appl. No. 16/858,536, filed Feb. 24, 2020, Inventors: Rosen Nikolaev Diankov and Denys Kanunikov, Applicant: MUJIN, Inc.
U.S. Appl. No. 16/802,451, filed Feb. 26, 2020, Inventors: Rosen Nikolaev Diankov and Denys Kanunikov, Applicant: MUJIN, Inc.
U.S. Appl. No. 16/874,587, filed May 14, 2020, Inventors: Rosen Nikolaev Diankov and Denys Kanunikov, Applicant: MUJIN, Inc.
Decision to Grant dated Oct. 6, 2020 for German patent application No. 1020191130902.6, 6 pages.
KIPO Office Action dated Sep. 24, 2021 for Korean patent application No. 9-5-2021-074997218, 12 pages.
KIPO Office Action dated Sep. 24, 2021 for Korean patent application No. 9-5-2021-075180279, 5 pages.
Office Action dated Sep. 3, 2021 for German patent application No. 102019130639.6, 24 pages.
KIPO Office Action dated Aug. 6, 2021 for Korean patent application No. 9-5-2021-062621061, 18 pages.
Office Action dated Sep. 10, 2021 for German patent application No. 102019130923.9, 19 pages.
KIPO Notice of Allowance dated Sep. 29, 2021 for Korean patent application No. 9-5-2021-076720887, 2 pages.
Corrected Notice of Allowability dated Jun. 24, 2021 for U.S. Appl. No. 16/886,734, filed May 28, 2020, 7 pages.

\* cited by examiner

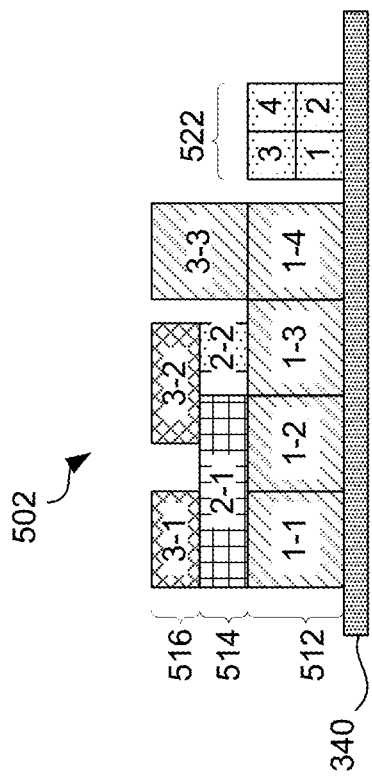
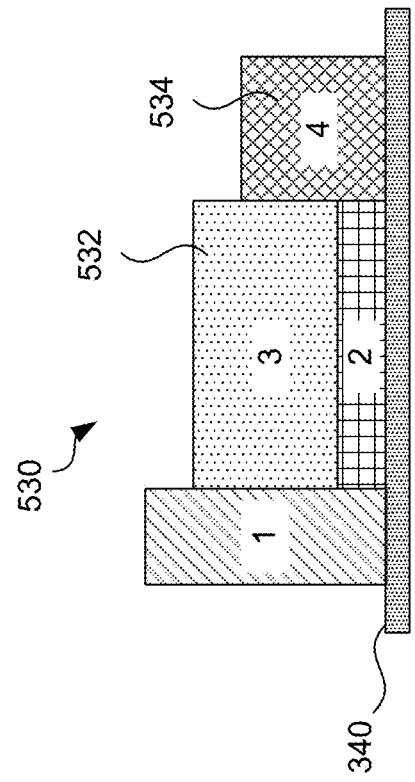
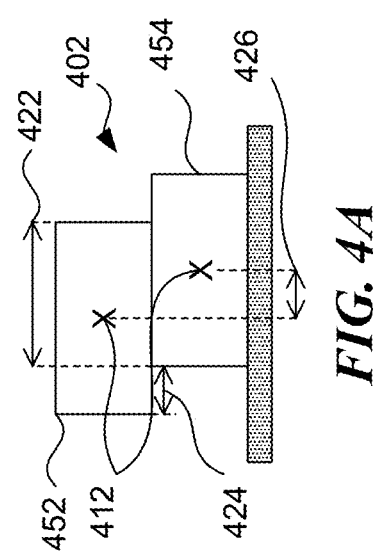
FIG. 4A
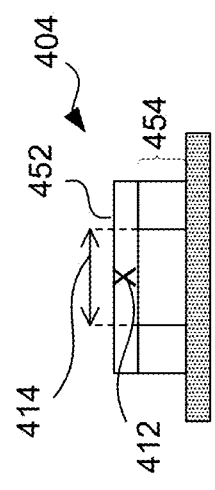
FIG. 4B
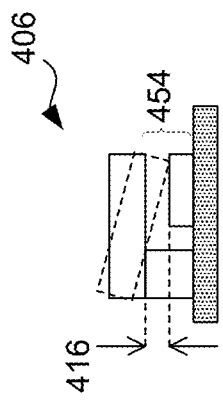
FIG. 4C

ROBOTIC SYSTEM FOR PALLETIZING PACKAGES USING REAL-TIME PLACEMENT SIMULATION

CROSS-REFERENCE TO RELATED APPLICATION(S)

This application is a continuation of U.S. patent application Ser. No. 16/428,870, filed May 31, 2019, now issued as U.S. Pat. No. 10,647,528 which is incorporated by reference herein in its entirety.

This application contains subject matter related to U.S. patent application Ser. No. 16/428,645, filed May 31, 2019, and titled "A ROBOTIC SYSTEM WITH PACKING MECHANISM," which is incorporated herein by reference in its entirety.

This application contains subject matter related to U.S. patent application Ser. No. 16/428,714, filed May 31, 2019, and titled "A ROBOTIC SYSTEM WITH DYNAMIC PACKING MECHANISM," which is incorporated herein by reference in its entirety.

This application contains subject matter related to U.S. patent application Ser. No. 16/428,809, filed May 31, 2019, and titled "A ROBOTIC SYSTEM WITH ERROR DETECTION AND DYNAMIC PACKING MECHANISM," which is incorporated herein by reference in its entirety.

This application contains subject matter related to U.S. patent application Ser. No. 16/428,843, filed May 31, 2019, and titled "ROBOTIC SYSTEM FOR PROCESSING PACKAGES ARRIVING OUT OF SEQUENCE," which is incorporated herein by reference in its entirety.

TECHNICAL FIELD

The present technology is directed generally to robotic systems and, more specifically, to systems, processes, and techniques for packing objects.

BACKGROUND

With their ever-increasing performance and lowering cost, many robots (e.g., machines configured to automatically/autonomously execute physical actions) are now extensively used in many fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing the human involvement that would otherwise be required to perform dangerous or repetitive tasks.

However, despite the technological advancements, robots often lack the sophistication necessary to duplicate human sensitivity and/or adaptability required for executing more complex tasks. For example, robots often lack the granularity of control and flexibility in the executed actions to account for deviations or uncertainties that may result from various real-world factors. Accordingly, there remains a need for improved techniques and systems for controlling and managing various aspects of the robots to complete the tasks despite the various real-world factors.

In the packaging industry, traditional systems use offline packing simulators to predetermine packing sequence/arrangement. The traditional packing simulators process object information (e.g., case shapes/sizes) to generate packing plans. The packing plans can dictate and/or require specific placement locations/poses of the objects at destinations (e.g., pallets, bins, cages, boxes, etc.), predefined sequences for the placement, and/or predetermined motion plans. From the generated packing plans, the traditional packing simulators derive source requirements (e.g., sequences and/or placements for the objects) that match or enable the packing plans. Because the packing plans are developed offline in traditional systems, the plans are independent of actual packing operations/conditions, object arrivals, and/or other system implementations. Accordingly, the overall operation/implementation will require the received packages (e.g., at the starting/pick up location) to follow fixed sequences that matches the predetermined packing plans. As such, traditional systems cannot adapt to deviations in the received packages (e.g., different sequence, location, and/or orientation), unanticipated errors (e.g., collisions and/or lost pieces), real-time packing requirements (e.g., received orders), and/or other real-time factors.

Traditional systems can group and pack objects according to rigid predetermined plans. For example, traditional systems transfer and place objects (e.g., boxes or cases) onto a pallet according to a predetermined motion plan. In doing so, the traditional systems either require all objects at a source location to either have a same dimension/type and/or accessed according to a known sequence. For example, the traditional systems would require the objects to arrive (via, e.g., conveyor) at a pickup location according to a fixed sequence. Also, for example, the traditional systems would require the objects at the pickup location to be placed at designated locations according to a predetermined pose. As such, traditional systems require one or more operations to order or place the objects at the source (i.e., before the packing operation) according to the predetermined sequence/arrangement. Providing the packages in a specific sequence to the robot can be a laborious task for humans. There are some machines, e.g., a shuttle sequencing buffer, that sequence the packages before passing them to the robot for further arrangement. However, these machines can be very expensive, require maintenance, and consume significant resources, such as space and power.

BRIEF DESCRIPTION OF THE DRAWINGS

FIGS. 4A-4C are illustrations of stacking rules in accordance with one or more embodiments of the present technology.

FIG. 5A is an illustration of an example stacking plan in accordance with one or more embodiments of the present technology.

FIG. 5B is an illustration of a stacking sequence in accordance with one or more embodiments of the present technology.

DETAILED DESCRIPTION

Figure 1:
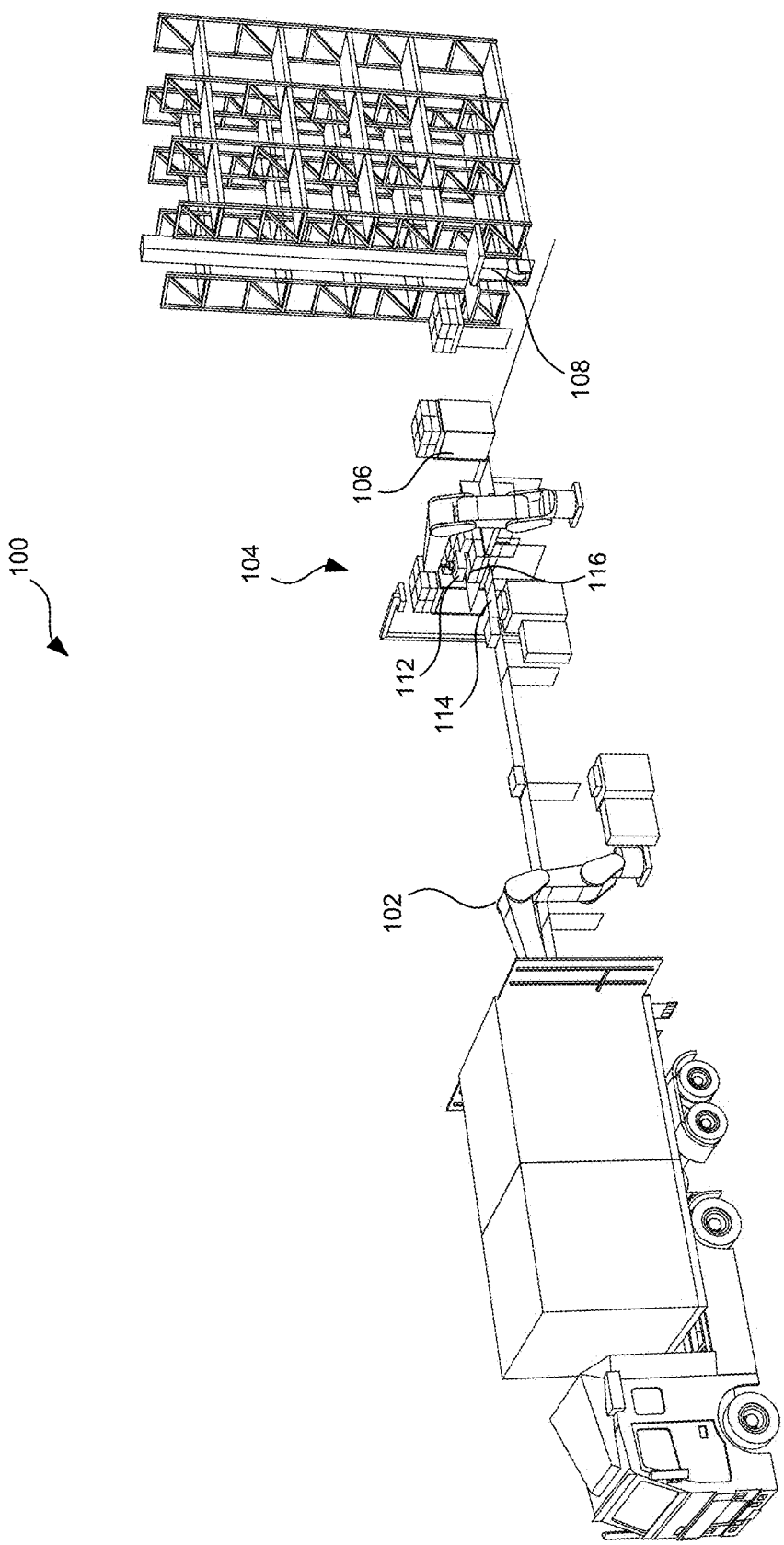
FIG. 1 is an illustration of an example environment in which a robotic system with a 3-dimensional packing mechanism may operate.

Systems and methods for a robotic system with 3-dimensional (3D) packing mechanism are described herein. The robotic system (e.g., an integrated system of devices that executes one or more designated tasks) configured in accordance with some embodiments provides enhanced packing and storage efficiency by deriving optimal storage locations for objects (e.g., packages) and stacking them accordingly. In one example, the robotic system can organize the packages at a destination (e.g., pallets, bins, cages, boxes, etc.) based on a stacking plan, regardless of an order in which the packages are provided to the robot. The stacking plan typically includes a stacking sequence or an in order in which the packages are to be placed on a pallet, among other details such as specific placement locations/poses of the packages on the pallet, and/or predetermined motion plans, which are described below. The robotic system can implement the stacking plan for placing the packages on the pallet without requiring the packages to be provided to the robotic system in the stacking sequence.

As the packages arrive, e.g., one after the other on a conveyor belt, at a start location of the robotic system, the robotic system processes each of the packages for placement on the platform. In some embodiments, processing a package can include identifying attributes of the package such as shape, size, height width, length and other physical dimensions, and storing the package in a storage area, e.g., on one of multiple storage racks, for later placement on the pallet. As the packages are being stored in the storage area, the robotic system can execute a simulation function to determine a stacking plan for placing the packages on the pallet. In some embodiments, the simulation function is executed in parallel to processing the packages, and can be updated continuously, e.g., as and when a new package is processed. When a palletizing trigger has occurred, the robotic system fetches the packages from the storage area and places them on the pallet according to the stacking plan. The palletizing trigger can be one of a time limit trigger, a uniform layer trigger, a storage capacity trigger, or receiving a placement initiation command.

By using a temporary storage area for storing packages, identifying the packages in real-time, and generating a stacking plan for the packages in real-time (e.g., as the packages arrive at the start location), the robotic system can eliminate the need for the packages to be (a) labeled with identifying attributes (e.g., using a bar code) before being provided to the robotic system and (b) received in a stacking sequence, which also eliminates the need for sequencing machines. Therefore, by minimizing consumption of resources, and improving the packing mechanism the disclosed embodiments result in an improved robotic system.

The robotic system described herein can generate the packing plans during system operation. The robotic system can generate a real-time and/or dynamic packing plan during the system operation based on various real-time conditions. Real-time conditions can include currently existing or ongoing conditions, such as actual source sequences/locations/poses of objects, object conditions and/or requirements, placement requirements, and/or other real-time factors. The robotic system can generate the packing plans in real-time, such as in response to a triggering event (e.g., a received order/request, a shipping schedule, and/or an operator input), according to current/ongoing conditions and factors at the time of the packing plan processing. In some embodiments, the packing plans can be dynamically (e.g., after initially starting one or more operations, such as the actual packing operation, begins) generated and/or adjusted, such as in response to a corresponding event (e.g., a re-evaluation timing, a packing/manipulation error, such as a collision or a lost piece, and/or occurrence of other dynamic conditions).

Unlike the traditional systems, the robotic system described herein can generate the placement plans in real-time according to current/live conditions (e.g., source sequences/locations/poses of objects, object conditions and/or requirements, etc.). In some embodiments, the robotic system can generate the packing plan based on a discretization mechanism (e.g., a process, a circuit, a function, and/or a routine). For example, the robotic system can use the discretization mechanism to describe physical sizes/shapes of objects and/or target locations according to a discretization unit (i.e., one discrete area/space). The robotic system can generate discretized object profiles that use the discretization units to describe the expected objects and/or discretized destination profiles that describe the target location (e.g., surface on top of the pallet and/or a space/bottom surface inside a bin/case/box). Accordingly, the robotic system can transform continuous real-world space/area into computer-readable digital information. Further, the discretized data can allow a reduction in computational complexity for describing package footprint and for comparing various package placements. For example, package dimensions can correspond to integer numbers of discretization units, which lead to easier mathematical computations, instead of real-world decimal number.

The robotic system can generate and evaluate 2-dimensional (2D) placement plans. The robotic system can select the 2D placement plans that satisfy one or more conditions/rules and translate the selected 2D placement plans into three-dimensional (3D) mapping results. The 3D mapping results can describe the heights of the 2D placement plans, such as according to height measurements of the objects included in the 2D placement plans and their relative locations within the layer. The robotic system can evaluate the 3D mapping results to vertically order/sequence to generate the 3D placement plans that include the vertical sequence for the 2D placement plans. In some embodiments, the robotic system can generate the 2D/3D placement plans for objects in an initial state (e.g., before any objects are placed at the destination zone) and/or for objects remaining in a non-packed state (e.g., after one or more objects have been placed at the destination zone). Details regarding the object grouping and the placement plans are described below.

The robotic system described below can utilize simplified and stream-lined processing architecture/sequence for real-time implementation. For example, the robotic system (via, e.g., a consumer computing device, such as a desk top, a server, etc.) can generate the packing plan based on real-time need (e.g., received order) and/or real-time availability (e.g., shipping manifesto of incoming objects and/or currently accessible objects) without utilizing the traditional sequencer and simulator. When utilized in an offline context, such as to replace the traditional sequencers and simulators, the robotic system can provide the offline packing plans using a simpler and cheaper solution.

Accordingly, the robotic system can improve efficiency, speed, and accuracy for packing the objects based on adapting to the real-time conditions. For example, the system described herein can generate the placement plans that match/address the currently need (e.g., received orders), the current status (e.g., location, orientation, and/or quantity/availability) of packages, and/or the real-time status of previously stacked/placed packages. As such, the robotic system can receive and pack packages that are in various different/unexpected quantities, locations, orientations, and/or sequences.

Further, the robotic system can reduce overall costs by eliminating the one or more operations, machines (e.g., sequence buffers), and/or human assistance that would be necessary in traditional systems to order or place the objects at the source and/or for the packing operation (e.g., for error handling).

In the following description, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or processor-executable instructions, including routines executed by a programmable computer or processor. Those skilled in the relevant art will appreciate that the disclosed techniques can be practiced on computer or processor systems other than those shown and described below. The techniques described herein can be embodied in a special-purpose computer or data processor that is specifically programmed, configured, or constructed to execute one or more of the computer-executable instructions described below. Accordingly, the terms "computer" and "processor" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and processors can be presented at any suitable display medium, including a liquid crystal display (LCD). Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

Suitable Environments

FIG. 1 is an illustration of an example environment in which a robotic system 100 with a packing mechanism may operate. The robotic system 100 can include and/or communicate with one or more units (e.g., robots) configured to execute one or more tasks. Aspects of the packing mechanism can be practiced or implemented by the various units.

For the example illustrated in FIG. 1, the robotic system 100 can include an unloading unit 102, a transfer unit 104 (e.g., a palletizing robot and/or a piece-picker robot), a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van and store them in a warehouse or to unload objects from storage locations and prepare them for shipping. For another example, the task can include placing the objects on a target location (e.g., on top of a pallet and/or inside a bin/cage/box/case). As described below, the robotic system can derive plans (e.g., placement locations/orientations, sequence for transferring the objects, and/or corresponding motion plans) for placing and/or stacking the objects. Each of the units can be configured to execute a sequence of actions (e.g., operating one or more components therein) to execute a task.

In some embodiments, the task can include manipulation (e.g., moving and/or reorienting) of a target object 112 (e.g., one of the packages, boxes, cases, cages, pallets, etc. corresponding to the executing task) from a start location 114 to a task location 116. For example, the unloading unit 102 (e.g., a devanning robot) can be configured to transfer the target object 112 from a location in a carrier (e.g., a truck) to a location on a conveyor belt. Also, the transfer unit 104 can be configured to transfer the target object 112 from one location (e.g., the conveyor belt, a pallet, or a bin) to another location (e.g., a pallet, a bin, etc.). For another example, the transfer unit 104 (e.g., a palletizing robot) can be configured to transfer the target object 112 from a source location (e.g., a pallet, a pickup area, and/or a conveyor) to a destination pallet. In completing the operation, the transport unit 106 can transfer the target object 112 from an area associated with the transfer unit 104 to an area associated with the loading unit 108, and the loading unit 108 can transfer the target object 112 (by, e.g., moving the pallet carrying the target object 112) from the transfer unit 104 to a storage location (e.g., a location on the shelves). Details regarding the task and the associated actions are described below.

For illustrative purposes, the robotic system 100 is described in the context of a shipping center; however, it is understood that the robotic system 100 can be configured to execute tasks in other environments/for other purposes, such as for manufacturing, assembly, packaging, healthcare, and/or other types of automation. It is also understood that the robotic system 100 can include other units, such as manipulators, service robots, modular robots, etc., not shown in FIG. 1. For example, in some embodiments, the robotic system 100 can include a depalletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

Suitable System

Figure 2:
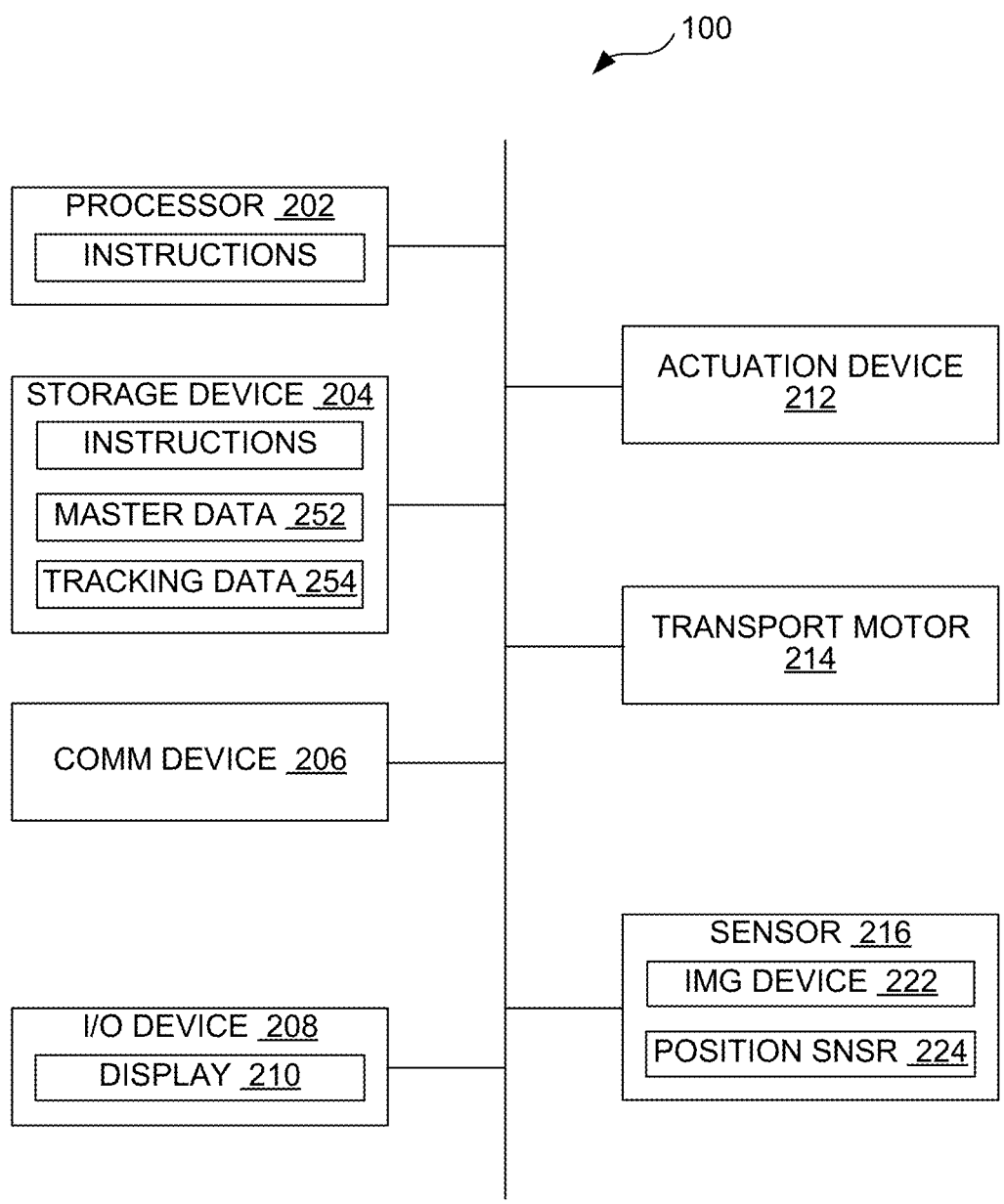
FIG. 2 is a block diagram illustrating the robotic system in accordance with one or more embodiments of the present technology.

FIG. 2 is a block diagram illustrating the robotic system 100 in accordance with one or more embodiments of the present technology. In some embodiments, for example, the robotic system 100 (e.g., at one or more of the units and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include bridges, adapters, processors, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IoT, LTE-M, etc.), and/or other wireless communication protocols.

The processors 202 can include data processors (e.g., central processing units (CPUs), special-purpose computers, and/or onboard servers) configured to execute instructions (e.g. software instructions) stored on the storage devices 204 (e.g., computer memory). In some embodiments, the processors 202 can be included in a separate/stand-alone controller that is operably coupled to the other electronic/electrical devices illustrated in FIG. 2 and/or the robotic units illustrated in FIG. 1. The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM)) and/or non-volatile memory (e.g., flash memory and/or magnetic disk drives). Other examples of the storage devices 204 can include portable memory drives and/or cloud storage devices.

In some embodiments, the storage devices 204 can be used to further store and provide access to processing results and/or predetermined data/thresholds. For example, the storage devices 204 can store master data 252 that includes descriptions of objects (e.g., boxes, cases, and/or products) that may be manipulated by the robotic system 100. In one or more embodiments, the master data 252 can include a dimension, a shape (e.g., templates for potential poses and/or computer-generated models for recognizing the object in different poses), a color scheme, an image, identification information (e.g., bar codes, quick response (QR) codes, logos, etc., and/or expected locations thereof), an expected weight, other physical/visual characteristics, or a combination thereof for the objects expected to be manipulated by the robotic system 100. In some embodiments, the master data 252 can include manipulation-related information regarding the objects, such as a center-of-mass (CoM) location on each of the objects, expected sensor measurements (e.g., for force, torque, pressure, and/or contact measurements) corresponding to one or more actions/maneuvers, or a combination thereof. Also, for example, the storage devices 204 can store object tracking data 254. In some embodiments, the object tracking data 254 can include a log of scanned or manipulated objects. In some embodiments, the object tracking data 254 can include imaging data (e.g., a picture, point cloud, live video feed, etc.) of the objects at one or more locations (e.g., designated pickup or drop locations and/or conveyor belts). In some embodiments, the object tracking data 254 can include locations and/or orientations of the objects at the one or more locations.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 214 configured to transport the corresponding units/chassis from place to place.

The robotic system 100 can include the sensors 216 configured to obtain information used to implement the tasks, such as for manipulating the structural members and/or for transporting the robotic units. The sensors 216 can include devices configured to detect or measure one or more physical properties of the robotic system 100 (e.g., a state, a condition, and/or a location of one or more structural members/joints thereof) and/or of a surrounding environment. Some examples of the sensors 216 can include accelerometers, gyroscopes, force sensors, strain gauges, tactile sensors, torque sensors, position encoders, etc.

In some embodiments, for example, the sensors 216 can include one or more imaging devices 222 (e.g., visual and/or infrared cameras, 2D and/or 3D imaging cameras, distance measuring devices such as lidars or radars, etc.) configured to detect the surrounding environment. The imaging devices 222 can generate representations of the detected environment, such as digital images and/or point clouds, that may be processed via machine/computer vision (e.g., for automatic inspection, robot guidance, or other robotic applications). As described in further detail below, the robotic system 100 (via, e.g., the processors 202) can process the digital image and/or the point cloud to identify the target object 112 of FIG. 1, the start location 114 of FIG. 1, the task location 116 of FIG. 1, a pose of the target object 112, a confidence measure regarding the start location 114 and/or the pose, or a combination thereof.

For manipulating the target object 112, the robotic system 100 (via, e.g., the various circuits/devices described above) can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor, a location for placing objects inside the container, or a location on the pallet for stacking purposes) to identify the task location 116. For example, the imaging devices 222 can include one or more cameras configured to generate images of the pickup area and/or one or more cameras configured to generate images of the task area (e.g., drop area). Based on the captured images, as described below, the robotic system 100 can determine the start location 114, the task location 116, the associated poses, a packing/placement plan, a transfer/packing sequence, and/or other processing results. Details regarding the packing algorithm are described below.

In some embodiments, for example, the sensors 216 can include position sensors 224 (e.g., position encoders, potentiometers, etc.) configured to detect positions of structural members (e.g., the robotic arms and/or the end-effectors) and/or corresponding joints of the robotic system 100. The robotic system 100 can use the position sensors 224 to track locations and/or orientations of the structural members and/or the joints during execution of the task.

Discretization Model Processing

Figure 3B:
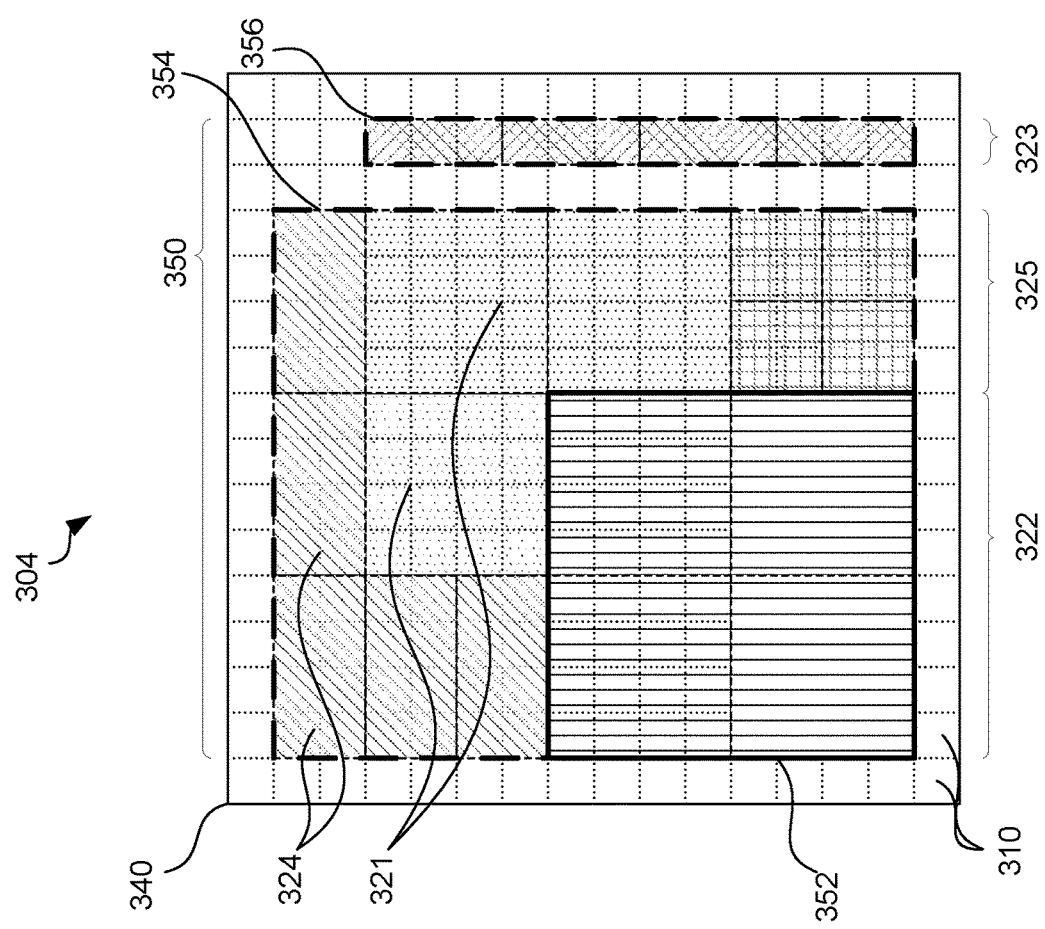
FIG. 3B is an illustration of discretized packing platform in accordance with one or more embodiments of the present technology.
Figure 3A:
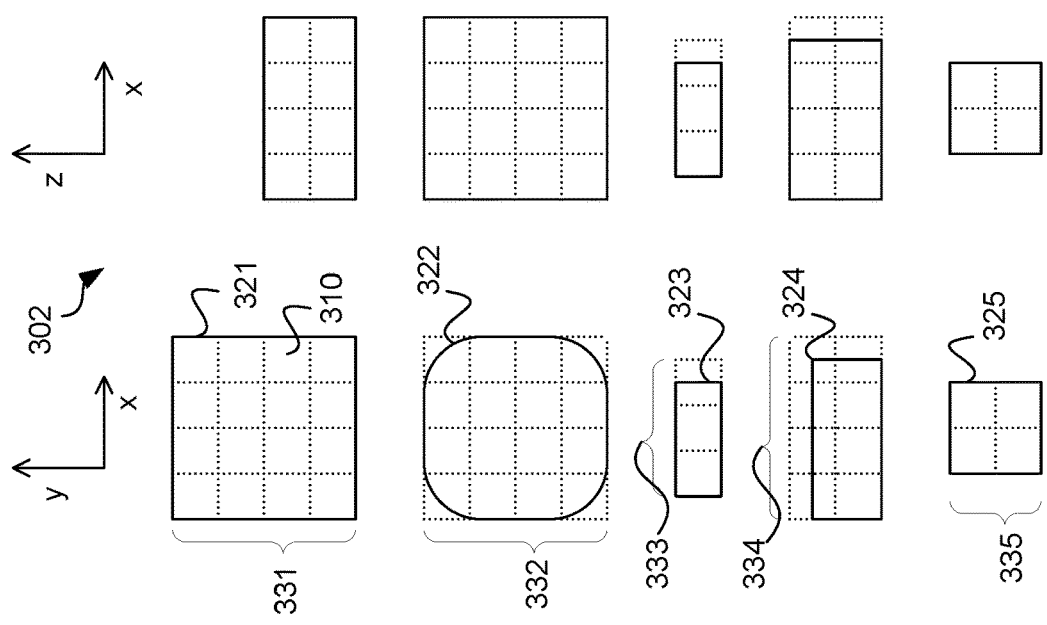
FIG. 3A is an illustration of discretized objects in accordance with one or more embodiments of the present technology.

FIG. 3A and FIG. 3B are illustrations of discretized data used to plan and pack objects in accordance with one or more embodiments of the present technology. FIG. 3A illustrates discretized objects and FIG. 3B illustrates discretized packing platform for the object packing and planning thereof. For example, the robotic system 100 of FIG. 1 (via, e.g., the processors 202 of FIG. 2) can map continuous surfaces/edges of real-world objects (e.g., packages, pallets, and/or other objects associated with the task) into discrete counterparts (e.g., unit lengths and/or unit areas). Also, the robotic system 100 can include discretized models/representations of the expected objects stored in the master data 252 of FIG. 2.

In some embodiments, as illustrated in FIG. 3A, the robotic system 100 can use discretized object models 302 to plan/derive stacking placements of objects. The discretized object models 302 (shown using dotted lines) can represent exterior physical dimensions, shapes, edges, surfaces, or a combination thereof (shown using solid lines) for known and/or expected objects (e.g., packages, boxes, cases, etc.) according to a discretization unit (e.g., a unit length). In some embodiments, as illustrated in FIG. 3B, the robotic system 100 can use one or more discretized platform models 304 to plan/derive stacking placements of objects. The discretized platform models 304 can represent a placement surface (e.g., a top surface of the pallet) according to the discretization unit. In some embodiments, the discretization unit can include a length that is preset by a system operator, a system designer, a predetermined input/setting, or a combination thereof.

In some embodiments, the discretized platform models 304 can include top views of one or more standard size pallets (e.g., 1.1 m by 1.1 m pallets). Accordingly, the discretized platform models 304 can correspond to pixelated 2D representations of the pallet top surfaces along a horizontal plane (e.g., the x-y plane) according to a grid system utilized by the robotic system 100. In some embodiments, the discretized object models 302 can include top views (e.g., x-y plane, as illustrated on the left side in FIG. 3A) and/or horizontal/profile views (e.g., x-z plane, as illustrated on the right side) for the objects expected/known by the robotic system 100. Accordingly, the discretized object models 302 can correspond to pixelated 2D/3D representations of the objects.

As an illustrative example, the robotic system 100 can use unit pixels 310 (e.g., polygons, such as squares, having one or more dimensions according to the discretization unit) to describe areas/surfaces of targeted objects (via, e.g., the discretized object models 302) and loading platforms (via, e.g., the discretized platform models 304). Accordingly, the robotic system 100 can pixelate the objects and the loading platforms along the x-y axes. In some embodiments, the size of the unit pixels 310 (e.g., the discretization unit) can change according to dimensions of the objects and/or dimensions of the loading platforms. The size of the unit pixels 310 can also be adjusted (via, e.g., a preset rule/equation and/or operator selection) to balance required resources (e.g., computation times, required memory, etc.) with packing accuracy. For example, when the size decreases, the computation times and the packing accuracy can increase. Accordingly, discretization of the packing tasks (e.g., the target packages and the packing platforms) using adjustable unit pixels 310 provides increased flexibility for palletizing the packages. The robotic system 100 can control a balance between the computation resources/time with the packing accuracy according to unique scenarios, patterns, and/or environments.

For the examples illustrated in FIG. 3A and FIG. 3B, the robotic system 100 can expect/process objects corresponding to a first package type 321, a second package type 322, a third package type 323, a fourth package type 324, and/or a fifth package type 325. The robotic system 100 can plan and place/stack the packages on a placement pallet 340 that corresponds to the task location 116 of FIG. 1. For the placement planning, the robotic system 100 can generate and/or utilize the discretized object models 302 including a first object model 331, a second object model 332, a third object model 333, a fourth object model 334, and/or a fifth object model 335 that respectively represent the corresponding packages using the unit pixels 310. Similarly, the robotic system 100 can generate and/or utilize the discretized platform model 304 for the placement pallet 340 using the unit pixels 310.

In some embodiments, the robotic system 100 can round up (e.g., for the discretized object models 302, such as for the third object model 333 and/or the fourth object model 334) the actual dimension of the object such that the unit pixels 310 extend beyond the actual peripheral edges of the object. In some embodiments, the robotic system 100 can round down (e.g., for the discretized platform models 304) the actual dimensions of the platform surface such that the unit pixels 310 are overlapped and/or contained within the actual peripheral edges of the object.

Based on the discretized data/representations, the robotic system 100 can generate a placement plan 350 for placing/packing the packages onto the placement pallet 340. The placement plan 350 can include planned locations on the placement pallet 340 for the targeted packages. The robotic system 100 can generate the placement plan 350 for placing one or more of available packages designated for loading/palletization. For example, the robotic system 100 can generate the placement plan 350 for stacking a set of packages from the available packages (e.g., received packages and/or outgoing ordered packages).

The robotic system 100 can generate the placement plan 350 according to a set of placement rules, placement conditions, parameters, requirements, etc. In some embodiments, the robotic system 100 can generate the placement plan 350 based on packages grouped according to the set, such as according to the package types (e.g., package types 321-325), package heights, customer specified priority, fragility (e.g., maximum supported weight, such as for packages stacked thereon), weight range, or a combination thereof. In some embodiments, the robotic system 100 can generate the placement plan 350 according to stacking conditions, such as, e.g., stacking the taller packages further away from the depalletizing unit. Other examples of the placement rules, conditions, parameters, requirements, etc. can include package dimensions, collision free requirement, stack stability, the grouping conditions (e.g., package types, package heights, priority, etc.), package separation requirements or the absence thereof, maximization of total loaded packages, or a combination thereof. Details regarding the placement planning is described below.

For the example illustrated in FIG. 3B, the robotic system 100 can generate the 2D placement plan (e.g., the placement plan 350) for a set of packages that correspond to the packages types 321-325. The robotic system 100 can generate the placement plan 350 that places three packages of the first package type 321, four packages of the second package type 322, four packages of the third package type 323, five packages of the fourth package type 324, and four packages of the fifth package type 325. The placement plan 350 can group the packages to maximize adjacent groupings of packages with similar height (e.g., equal or within a threshold limit from each other). Accordingly, the robotic system 100 can group the four of the second package type 322 in a 2×2 arrangement located at the lower left-hand corner of the placement pallet 340. A second grouping of packages (e.g., the packages of the first package type 321, the fourth package type 324, and the fifth package type 325) can be placed around the initially placed group. Accordingly, the continuous surface area for the first grouping (e.g., at a height of four unit pixels 310) and the surface area for the second grouping (e.g., at a height of two unit pixels 310) can be maximized. Also, the robotic system 100 can separate the packages of the third package type 323 based on one or more requirements, such as fragility (e.g., limiting the number of supported items) and/or separation requirements. Similarly, the robotic system 100 can generate the 2D placement plan according to boundary requirements (e.g., one or more of the unit pixels 310 from the edge of the placement pallet 340).

In some embodiments, the robotic system 100 can generate the placement plan 350 based on 2D planning (e.g., x-y footprint, such as a top-view) and/or 3D planning (e.g., x-z or y-z footprint, such as a profile-view). For example, the robotic system 100 can generate the placement plan 350 based on iteratively deriving potential 2D placements along the x-y plane, testing the potential placements according to the placement rules, conditions, etc., calculating a placement score, or a combination thereof. The robotic system 100 can generate the placement plan 350 based on selecting the 2D placement plan that optimizes (e.g., highest or lowest) the placement score. In some embodiments, the robotic system 100 can use the 2D placement plan to further generate a 3D plan (e.g., stacking plan; not shown in FIG. 3B). For example, the robotic system 100 can generate the 3D placement plan based on using the 2D placement plan as a layer within a stack. In other words, the robotic system 100 can place the generated 2D placement over/on top of one or more layers (e.g., other 2D placement plans) and/or under/below one or more other layers.

As an illustrative example, the robotic system 100 can estimate and consider heights of the placed objects in deriving the 2D plans. For example, the robotic system 100 can pixelate the object heights (e.g., stored in the master data) as shown in FIG. 3D. Also, the robotic system 100 can map the predetermined height data of the placed object to each of the unit pixels occupied by the object. With the heights mapped to each of the pixels, the robotic system 100 derive placement surfaces of the resulting 2D placement plan 350. The placement surfaces can each correspond to a derived surface/plane that can have, and support objects placed thereon, such as due same or similar heights of objects forming the derived surface.

The robotic system 100 can derive placement surfaces based on identifying groupings of unit pixels that have height values that are within a threshold range of each other. In some embodiments, the robotic system 100 can derive the placement surfaces based on identifying a maximum height for the placement plan 350. Based on the maximum height, the robotic system 100 can identify the unit pixels in the placement plan 350 having heights matching or within a threshold range from the maximum height. The robotic system 100 can derive an outline based on connecting corners and/or extending edges of outermost/perimeter unit pixels with qualifying heights to derive the placement surface. The robotic system 100 can recursively repeat the process for regions outside of the placement areas using lower heights. For the example illustrated in FIG. 3B, the robotic system 100 can derive a first placement surface 352, a second placement surface 354, and a third placement surface 356. The first placement surface 352 can correspond to the rectangular area shown in the lower left corner of the placement plan 350 with the maximum height of four unit pixels. The second placement surface 354 can correspond to the surrounding area (shown using dashed lines) with height of two unit pixels. The third placement surface 356 can correspond to the separate area on the right side of the placement plan 350 with the height of one unit pixel. Details for the 2D and 3D placement planning are described below.

Figure 3C:
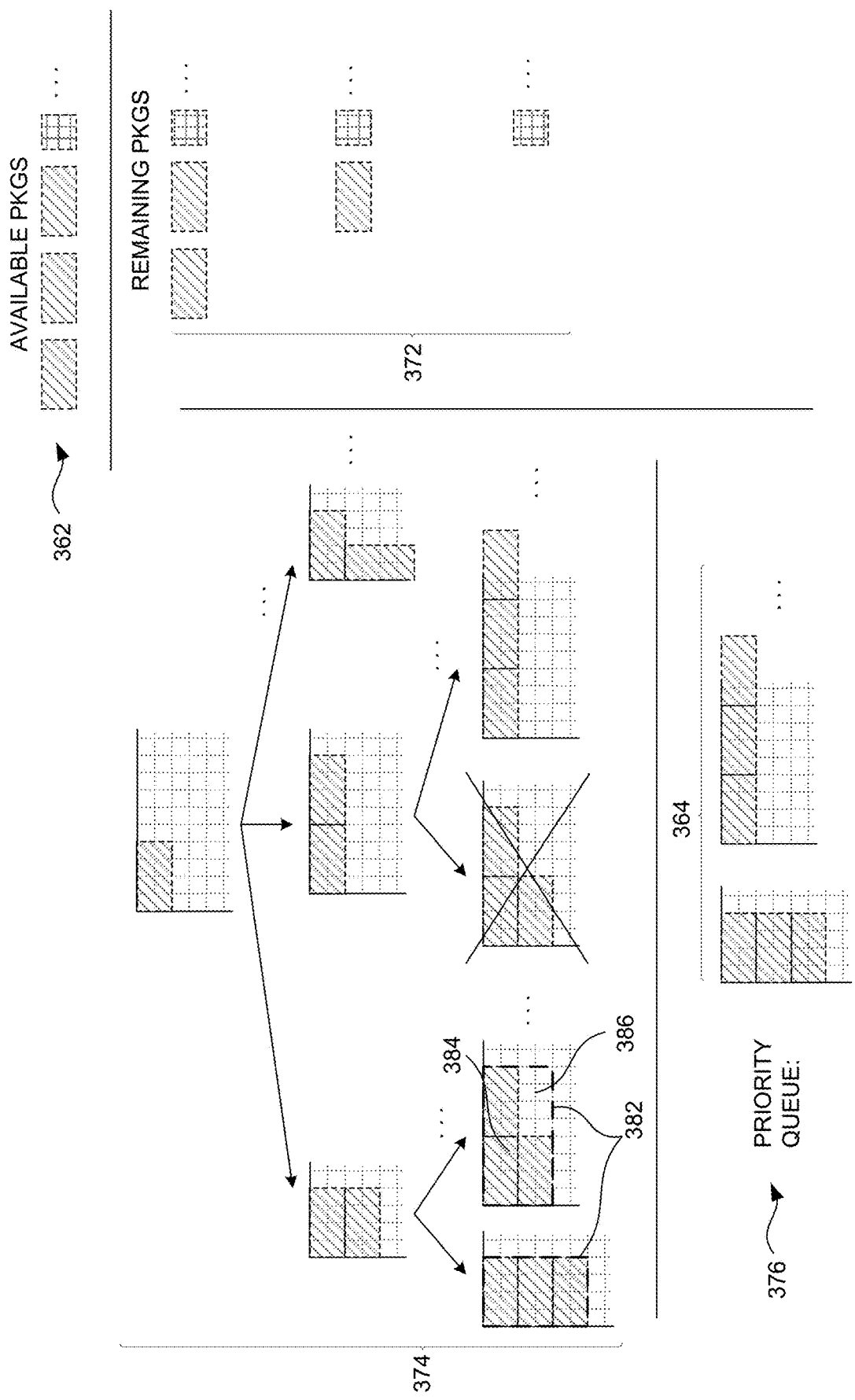
FIG. 3C is an illustration of a placement planning process in accordance with one or more embodiments of the present technology.

FIG. 3C is an illustration of a placement planning process in accordance with one or more embodiments of the present technology. The robotic system 100 (via, e.g., the one or more processors 202 of FIG. 2) can derive the placement plan 350 of FIG. 3B for a set of available packages 362. The available packages 362 can correspond to the objects that need to be packed for an egress shipment and/or storage. For example, the available packages 362 can correspond to incoming objects received via an ingress shipment and/or stored objects that have been ordered for an egress shipment. In some embodiments, the robotic system 100 can use a shipping manifest, an order list, etc. to identify the available packages 362 in real-time, such as directly in response to (i.e., within a threshold duration from) receiving the manifest, the list, etc. Accordingly, the robotic system 100 can use the identified available packages 362 to derive the placement plan 350 in real-time. As such, the robotic system 100 can use real-time conditions, availability, and/or demands to derive the placement plan 350 instead of off-line packing simulators that utilize a hypothetical number/set/combination of packages to derive plans that are applied regardless of real-time conditions. In some embodiments, the robotic system 100 can use devices (e.g., one or more of the processors 202) located at the location receiving, storing, and/or sending the objects, such as a shipping hub and/or a warehouse.

In some embodiments, as discussed in detail below, the robotic system 100 can group and/or sequence the available packages 362. The robotic system 100 can use the ordered set of the available packages 362 to derive the placement plan 350. The robotic system 100 can determine and evaluate unique placement locations/combinations for the available packages 362 to derive the placement plan 350. In other words, the robotic system 100 can determine a set of potential placement combinations 364 and evaluate (e.g., score) them according a set of predetermined requirements, conditions, weights, costs, subsequent implications, or a combination thereof. Based on the evaluation, the robotic system 100 can select a placement combination to derive the placement plan 350.

In at least one embodiment, the robotic system 100 can derive the placement plan 350 using an algorithm that iteratively evaluates placements of the sequenced packages. As illustrated in FIG. 3C, for example, the robotic system 100 can begin the derivation by determining an initial placement for the first package in the available packages 362. Accordingly, the robotic system 100 can overlap the corresponding discretized object model 302 of FIG. 3A over the discretized platform model 304 of FIG. 3B at an initial location (e.g., a corner, a middle location, and/or another preset location). The robotic system 100 can track remaining packages 372 based on removing the placed package (e.g., the first package) from the available packages 362.

Based on the initial placement, the robotic system 100 can determine a set of possible placements for the second package in the available packages 362. The robotic system 100 can determine the set of possible placements according to a predetermined rule, pattern, or a combination thereof. For example, the robotic system 100 can determine the placement locations according to a pattern of locations relative to the previously placed package(s) (e.g., relative to the previously placed package(s)). Also, the robotic system 100 can determine the placement locations based on a minimum/maximum separation distance or a lack thereof required between one or more of the packages. Further, the robotic system 100 can determine the placement locations based on rotating the package (i.e., the corresponding discretized object model 302) according to a predetermined amount, such as 90 degrees. In some embodiments, the robotic system 100 can limit the placement possibilities according to a predetermined threshold and/or pattern. Further, the robotic system 100 can update the remaining packages 372 accordingly.

The robotic system 100 can repeat the above-described process and iteratively process the available packages 362 until a stopping condition is reached. Some examples of the stopping condition can represent that all packages have been placed (i.e., the remaining packages 372 is empty), the placements cannot be improved (e.g., same evaluation score as the previous tier/iteration), no more packages can be placed over the discretized platform model 304, or a combination thereof.

In some embodiments, the robotic system 100 can track the possible placements and the corresponding potential placement combinations 364 using a search tree 374. A root of the search tree 374 can correspond to the initial placement and each level or tier can include potential placements of the subsequent package in the available packages 362. The different tiers can be connected to form a branch that corresponds to a unique combination of placements for the set of packages.

For potential placements of each package, the robotic system 100 can identify and eliminate (e.g., represented by 'X' in FIG. 3C) redundant footprints. For example, at each tier of the search tree 374, the robotic system 100 can compare (e.g., overlay) the resulting footprints of the potential placement locations/combinations. Based on the comparison, the robotic system 100 can eliminate duplicates of the resulting footprints. In some embodiments, the robotic system 100 can further compare transposed, rotated, and/or mirrored versions of the resulting footprints to eliminate related duplicates. For example, the robotic system 100 can rotate one footprint by 90 degrees and/or transpose the footprint across one or more mirroring lines (e.g. a diagonal line extending across opposing corners, a bisecting line(s) extending along x and/or y directions, or a combination thereof) and compare it to other footprints.

Also, for potential placements of each package, the robotic system 100 can identify and eliminate placements that violate one or more requirements/constraints. One example of the requirements/constraints can be based on collision probabilities. The robotic system 100 can calculate an approach path for each placement location and a corresponding collision probability according to the pre-existing footprint, one or more dimensions of the packages, a location of the transfer robot, a previous event or history, or a combination thereof. The robotic system 100 can eliminate the placements where the collision probability exceeds a predetermined threshold. Another example of the requirements/constraints can be a supported weight for stacking (i.e., placing directly on/over one or more support packages) the package. For one or more of the packages under the placement location, the robotic system 100 can calculate a support weight (i.e., a combined weight of packages or portions thereof directly over) based on the weight of the placed package. The robotic system 100 can eliminate the placements where the support weight violates (e.g., exceeds or is within a threshold range from) a fragility requirement (e.g., a maximum supportable weight) for one or more of the packages under the placement location.

In some embodiments, the robotic system 100 can track and/or evaluate the placement combinations 364 using a priority queue 376 (e.g., a heap structure etc.). The priority queue 376 can order the placement combinations 364 according to a sequence of preferences. The robotic system 100 can evaluate or score each of the placement combinations 364 according to one or more predetermined criteria. The criteria can include one or more costs associated with already placed items and/or one or more heuristic scores associated with how the current placement affects future placements or possibilities.

One example of the criteria can include maximization of footprint density. The robotic system 100 can calculate the footprint density for an outer perimeter 382 for a grouping of packages. In some embodiments, the outer perimeter 382 can be determined based on exposed/outer perimeter edges of the grouping of packages. The robotic system 100 can further enclose surrounding/related areas by extending two or more edges and finding an intersect and/or by drawing a line that connects one or more corners of the footprint. The robotic system 100 can calculate the footprint density as a ratio between an actual occupied area 384 (e.g., a number of unit pixels 310 corresponding to the shaded area) and an empty area 386 (e.g., a number of unit pixels 310 corresponding to the enclosed/related areas). The robotic system 100 can be configured to prefer (e.g., by assigning a higher/lower score) to placement plans that minimize the empty area 386.

Stacking Rules

FIGS. 4A-4C are illustrations of stacking rules in accordance with one or more embodiments of the present technology. The robotic system 100 can use the stacking rules to place packages on top of each other, such as for stacking/placing one or more layers of packages above one or more other layer(s) of packages. The robotic system 100 can use the stacking rules for improving stability of the stacked packages and prevent any packages from slipping and/or tipping during movement of the pallet. For illustrative purposes, FIGS. 4A-4C show a top package 452 directly above and supported by (e.g., directly contacting) one or more support packages 454.

FIG. 4A illustrates a horizontal offset rule 402 used to generate 3D placements (e.g., the 3D placement plan 350). The horizontal offset rule 402 can include a regulation, a requirement, or a combination thereof for controlling horizontal offsets of vertical edges/surfaces between stacked items. For example, the horizontal offset rule 402 can be based on an overlap requirement 422, an overhang requirement 424, or a combination thereof. The overlap requirement 422 can include a minimum amount (e.g., a percentage or a ratio of length, width, and/or surface area) of overlap between the stacked packages. In some embodiments, the overlap requirement 422 can require that a minimum amount of horizontal dimension/surface area of the top package 452 is overlapped with that of the support package 454. The overhang requirement 424 can include a maximum amount (e.g., a percentage or a ratio of length, width, and/or surface area) of overhang, such as a portion of the top package 452 that horizontally extends past a perimeter edge/surface of the support package 454.

In some embodiments, the horizontal offset rule 402 can be based on weight, dimension, and/or center-of-mass (CoM) locations 412. For example, the overlap requirement 422 and/or the overhang requirement 424 can be based on the CoM locations 412, such as for evaluating a distance between the CoM locations 412 of the top package 452 and the support package 454 relative to a distance between the top CoM location and a horizontal edge/surface of the support package 454 and/or an overhang distance (e.g. a measure along a horizontal direction of a portion of the top package 452 extending past peripheral edge(s) of the support package 454). In some embodiments, the horizontal offset rule 402 can be based on a CoM offset requirement 426 that requires the CoM locations 412 of the top packages 452 and the support packages 454 to be within a threshold. The threshold can include a predetermined distance, a threshold limit for a ratio between the offset distance between the CoM locations 412 relative to a horizontal dimension, an overhang distance, an overlapped distance, or a combination thereof.

FIG. 4B illustrates a support separation rule 404 used to generate 3D placements (e.g., a stacking plan). The support separation rule 404 can include a regulation, a requirement, or a combination thereof for controlling a horizontal separation distance 414 between the support packages 454. The horizontal separation distance 414 can correspond to a horizontal distance between peripheral surfaces/edges of adjacent support packages 454. In some embodiments, the support separation rule 404 can be further based on locations and/or amounts of overlapped surfaces between the top package 452 and the support packages 454. For example, the support separation rule 404 can require that the horizontal separation distance 414 to be larger than any overhang distances by a predetermined percentage. Also, the support separation rule 404 can require that the horizontal separation distance 414 extends under the CoM location 412 of the top package 452.

FIG. 4C illustrates a vertical offset rule 406 used to generate 3D placements (e.g., the 3D placement plan 350). The vertical offset rule 406 can include a regulation, a requirement, or a combination thereof for controlling a support height difference 416 between vertical locations of the supporting packages 454. The support height difference 416 can correspond to a vertical distance between top portions of corresponding support packages 454, such as for portions that would likely contact the top package 452 placed over the corresponding support packages 454. In some embodiments, the vertical offset rule 406 can require the support height difference 416 to be under a predetermined threshold requirement for stacking one or more packages on top of the supporting packages 454. In some embodiments, the support separation rule 404 can vary based on the layer height. For example, when the top package 452 (e.g., the supported package) is part of the top-most layer, the limit for the support height difference 416 can be greater than for the lower layers.

The robotic system 100 can generate stacking plans (e.g., a 3D combination of multiple 2D placement plans) according to the stacking rules. For example, the robotic system 100 can generate the 2D placement plans (e.g., the placement plan 350 of FIG. 3B) according to height requirements (e.g., for keeping the heights of the package groupings within a threshold distance). Subsequently, the robotic system 100 can generate the stacking plans based on vertically overlapping (e.g., stacking) the 2D placement plans.

Stacking Sequence

FIG. 5A is an illustration of an example of a stacking plan 502 (e.g., a plan representing a 3D mapping of the available packages and/or the placement plans 350 correspond to layers within the 3D mapping) in accordance with one or more embodiments of the present technology. For illustrative purposes, the stacking plan 502 is illustrated using a first layer 512, a second layer 514, and a third layer 516 for a first stack 520 of the packages (e.g., e.g., at least the packages 1-1 to 1-4, 2-1 to 2-2, and 3-1 to 3-3). Each of the first layer 512, the second layer 514, and the third layer 516 can be an instance of the placement plan 350. The first layer 512 can be on the bottom such that the packages (e.g., at least the packages 1-1, 1-2, 1-3, and 1-4) therein directly contact the placement pallet 340. The packages (e.g., at least the packages 2-1 and 2-2) in the second layer 514 can be directly on (i.e. having direct contact with) and above the first layer 512. Similarly, the packages (e.g., at least the packages 3-1 and 3-2) of the third layer 516 can be directly on and contact the second layer 514.

As discussed in detail below, the robotic system 100 can plan each of the layers separately while considering vertical parameters (e.g., supported weight, layer height, etc.). In generating the stacking plan 502, the robotic system 100 can vertically combine and/or sequence the separate layers according to the vertical parameters and/or the stacking rules. In some embodiments, the robotic system 100 can plan the layers according to vertical placement of the packages. For example, the robotic system 100 can generate the first layer 512 as including all packages that directly contact the placement pallet 340, such as including the bottom two packages in a second stack 522. Also, the robotic system 100 can plan the package labeled '3-3' as part of the second layer 514. In some embodiments, the robotic system 100 can re-plan and/or adjust the layers (e.g., the placement plan 350) in generating the stacking plan 502. For example, the robotic system 100 can adjust the layers to facilitate the stacking/placement sequence. As illustrated in FIG. 5A, the robotic system 100 can adjust the layers such that the second stack 522 is considered a separate stack (i.e., separate from the first, second, and third layers 512-516). Accordingly, the robotic system 100 can be free to plan and/or stack the packages of the second stack 522 separately/differently from the layers of the first stack 520.

Also, in some embodiments, the robotic system 100 can move larger packages closest to the transfer unit 104 of FIG. 1 (e.g., the palletizing robot) to a higher layer to facilitate stacking sequence. Assuming that the transfer unit 104 is to the right of the placement pallet 340 illustrated in FIG. 5A, the '3-3' package can become an obstacle (i.e., due to its height) if it is placed before packages labeled '3-1' and '3-2'. Accordingly, the robotic system 100 can adjust the layers such that the '3-3' package is part of a higher layer (e.g., the third layer 516 instead of the second layer 512). As a result, when the robotic system 100 places the packages according to the layers, the '3-3' package can be placed after the '3-1' and '3-2' packages.

In other alternative embodiments, the robotic system 100 can separately calculate the stacking or placement sequences based on analyzing the stacking plan 502 without being bound to the layers. For discussion purposes, FIG. 5B is an illustration of a stacking sequence 530 (e.g., an identification of a placing order for the available packages) that is not bound by stacking of packages according to the layers in accordance with one or more embodiments of the present technology. The stacking sequence 530 can be for placing a stacked package 532 above a supporting package and horizontally between two end packages. The stacking sequence 530 can be such that the package (labeled '1') furthest from the transfer unit 104 (not illustrated in FIG. 5B, assumed to be located to the right of the placement pallet 340) can be placed first and the second package (labeled '2') is placed on the placement pallet 340 afterwards. The robotic system 100 can calculate the stacking sequence 530 such that the stacked package 532 (labeled '3') is placed before (e.g., third) one of the end packages 534 (labeled '4'). As described above, the robotic system 100 can calculate the stacking sequence 530 based on adjusting the one of the end packages 534 to belong to a second layer with the stacked package 532 or based on independently calculating the stacking order from the stacking plan 502.

Operational Flow

Figure 6:
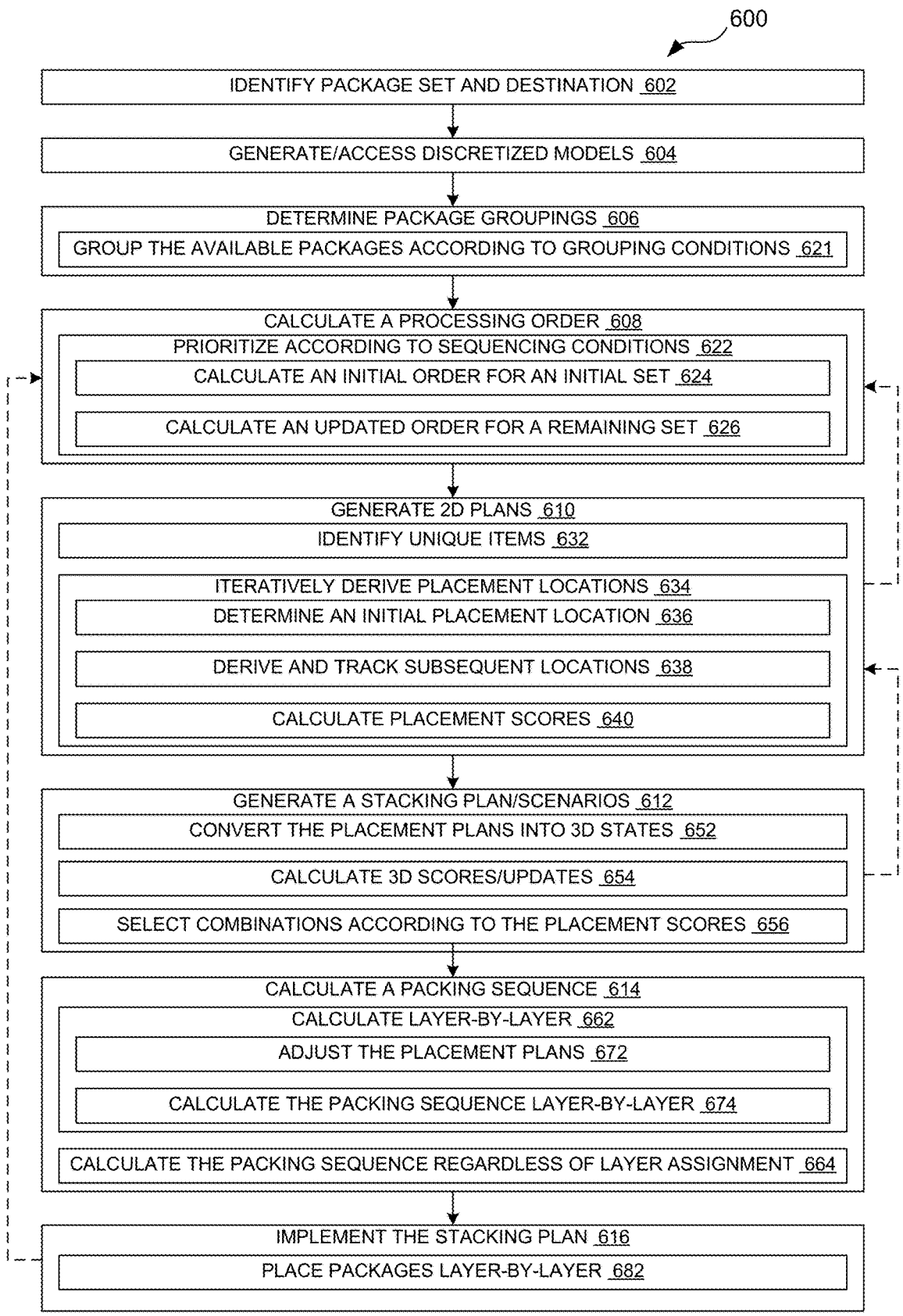
FIG. 6 is a flow diagram for operating the robotic system of FIG. 1 in accordance with one or more embodiments of the present technology.

FIG. 6 is a flow diagram for a method 600 of operating the robotic system 100 of FIG. 1 in accordance with one or more embodiments of the present technology. The method 600 can be for generating 2D/3D packing plans for placing packages (e.g., cases and/or boxes) on to a platform (e.g., a pallet) and/or for placing the packages accordingly. The method 600 can be implemented based on executing the instructions stored on one or more of the storage devices 204 of FIG. 2 with one or more of the processors 202 of FIG. 2.

At block 602, the robotic system 100 can identify a package set (e.g., the available packages 362 of FIG. 3C) and a destination (e.g., the task location 116 of FIG. 1, such as a pallet and/or a container for receiving the packages). For example, the robotic system 100 can identify the package set to represent the available packages 362 including packages that are available for packing, located at a source, designated for placement, and/or listed in an order/request/manifest. Also, the robotic system 100 identify a size or a dimension of an area (e.g., a top loading surface of the pallet, such as the placement pallet 340 of FIG. 3) of the task location 116 where the packages can be placed. In some embodiments, the robotic system 100 can identify a size, a dimension, a type, or a combination thereof for a pallet.

At block 604, the robotic system 100 can generate and/or access discretized models (e.g., the discretized object models 302 of FIG. 3A and/or the discretized platform models 304 of FIG. 3B) corresponding to the package set that represent the available packages 362 and/or the task location 116. In some embodiments, the robotic system 100 can generate (e.g., in real-time, such as after receiving the order and/or prior to beginning the packing operation, or offline) the discretized models based on dividing physical dimensions of the objects and/or the platform area (e.g., the pallet top surface according to the unit pixel 310 of FIG. 3B). The unit pixel 310 can be predetermined (by, e.g., a manufacturer, an ordering customer, and/or an operator), such as at 1 millimeters (mm) or 1/16 inches (in) or greater (e.g., at 5 mm or 20 mm). In some embodiments, the unit pixel 310 can be based (e.g., a percentage or a fraction) on a dimension or a size of one or more of the packages and/or the platform.

In some embodiments, the robotic system 100 can access the discretized models stored in the storage devices 204 and/or another device (e.g., a storage device, a database, and/or a server of a package supplier accessed via the communication devices 206 of FIG. 2). The robotic system 100 can access the predetermined discretized models that represents the available packages 362 and/or the task location 116. For example, the robotic system 100 can access the discretized object models 302 corresponding to the available packages 362 by searching the master data 252 of FIG. 2 (e.g., a predetermined table or a lookup table) for the available packages and their corresponding models. Similarly, the robotic system 100 can access the discretized platform model 304 representing the platform, such as the identified pallet, where the available packages are to be placed.

At block 606, the robotic system 100 can determine package groupings (e.g., subgroupings of the available packages). The robotic system 100 can determine the package groupings based on the available packages 362 for placing them on the identified platform (e.g., the placement pallet 340). The robotic system 100 can determine the package groupings according to similarities and/or patterns in one or more characteristics of the available packages 362. In some embodiments, as illustrated at block 621, the robotic system 100 can determine the package grouping by grouping the available packages 362 according to grouping conditions/requirements. Some examples of the grouping conditions/requirements can include a package priority (e.g., as specified by one or more customers), a fragility rating (e.g., a maximum weight supportable by the package), a weight, a package dimension (e.g., a package height), a package type, or a combination thereof. In grouping the available packages 362, the robotic system 100 can search the master data 252 for the various characteristics of the available packages 362 that match the grouping conditions/requirements.

At block 608, the robotic system 100 can calculate a processing order (e.g., a sequence for considering/deriving placement locations) for the available packages 362 and/or the groupings thereof (i.e., the package groupings). In some embodiments, as illustrated at block 622, the robotic system 100 can calculate the processing order according to one or more sequencing conditions/requirements. For example, the robotic system 100 can prioritize placement planning of the package groupings according to a number of packages within each of the groupings, such as for processing the package groupings with greater number of packages earlier in the placement planning. In some embodiments, the sequencing conditions can overlap with the grouping conditions, such as for the weight ranges, the fragility ratings, etc. For example, the robotic system 100 can prioritize the processing of the heavier and/or the less fragile packages for earlier processing and/or for placement in lower layers.

In some embodiments, the robotic system 100 can prioritize the placement planning according to a combined horizontal area. The robotic system 100 can calculate (via, e.g., multiplying corresponding widths and lengths) or access surface areas of top surfaces of the packages in the groupings using information specified in the master data 252. In calculating the combined horizontal area, the robotic system 100 can add the surface areas of packages having the same type and/or heights within a threshold range. In some embodiments, the robotic system 100 can prioritize the placement planning of groupings that have the larger combined horizontal area for earlier processing and/or for placement in lower layers.

For one or more embodiments, the robotic system 100 can load a buffer with identifiers and/or quantities of the available packages 362. The robotic system 100 can sequence the identifiers in the buffer according to the groupings. Further, the robotic system 100 can sequence the identifiers in the buffer according to the processing order. Accordingly, the sequenced values in the buffer can correspond to the available packages 362 and/or the remaining packages 372 illustrated in FIG. 3C.

As illustrated at block 624, for example, the robotic system 100 can calculate the processing order for an initial set (e.g., the package set) of the available packages 362 before implementing the corresponding stacking plan 502 of FIG. 5, such as before any of the packages in the package set is placed on the platform. In some embodiments, as illustrated at block 626, the robotic system 100 can calculate the processing order for a remaining set of the available packages 362 after initiating or while implementing the corresponding stacking plan 502. For example, as illustrated by a feedback loop from block 616, the robotic system 100 can calculate the processing order for the remaining set (e.g., a portion of the available packages 362 that have not been transferred to the platform and/or remain at a source location) according to one or more triggering conditions. Example triggering conditions can include stacking errors (e.g., lost or fallen packages), collision events, predetermined retriggering timings, or a combination thereof.

At block 610, the robotic system 100 can generate 2D plans (e.g., the placement plans 350 of FIG. 3B) for placing the available packages 362 along a horizontal plane. For example, the robotic system 100 can generate the placement plans 350 to represent the 2D mappings of the available packages 362 along the horizontal plane. The robotic system 100 can generate two or more placement plans based on the discretized models. For example, the robotic system 100 can generate the placement plans 350 based on comparing the discretized object models 302 to the discretized platform model 304. The robotic system 100 can determine different placements/arrangements of the discretized object models 302, overlap/compare them to the discretized platform model 304, and validate/retain the arrangements that are within the boundaries of the discretized platform model 304 when overlapped. The robotic system 100 can designate the packages that cannot be placed within the boundaries of the discretized platform model 304 for another layer (e.g., another instance of the placement plans 350). Accordingly, the robotic system 100 can iteratively derive placement locations for the placement plans 350 that represent 2D layers of the stacking plan 502 until each of the packages in the package set have been assigned a location in the placement plans 350.

In some embodiments, the robotic system 100 can generate the placement plans 350 based on the package groupings. For example, the robotic system 100 can determine the arrangements for the packages within one package grouping before considering placements of packages in another grouping. When packages within a package grouping overflows a layer (i.e., cannot fit in one layer or one instance of the discretized platform model 304) and/or after placing all packages of one grouping, the robotic system 100 can assign locations for the packages in the next grouping to any remaining/unoccupied areas in the discretized platform model 304. The robotic system 100 can iteratively repeat the assignments until none of the unassigned packages can fit over remaining spaces of the discretized platform model 304.

Similarly, the robotic system 100 can generate the placement plans 350 based on the processing order (e.g., based on the package groupings according to the processing order). For example, the robotic system 100 can determine a test arrangement based on assigning packages and/or groupings according to the processing order. The robotic system 100 can assign the earliest sequenced package/grouping an initial placement for the test arrangement, and then test/assign the subsequent packages/groupings according to the processing order. In some embodiments, the robotic system 100 can retain the processing order for the packages/groupings across layers (e.g., across instances of the placement plans 350). In some embodiments, the robotic system 100 can recalculate and update (illustrated using dashed feedback line in FIG. 6) the processing order after each layer is filled.

In some embodiments, as an illustrative example of the above described processes, the robotic system 100 can generate the 2D plans by identifying the different package types (e.g., the first, second, third, fourth, and/or the fifth package type 321-325 of FIG. 3A, respectively) within the package set. In other words, at block 632, the robotic system 100 can identify unique packages (e.g., as represented by the package types) within each of the package grouping and/or the package set.

At block 634, the robotic system 100 can derive (e.g., iteratively) placement locations for each of the available packages 362. At block 636, the robotic system 100 can determine an initial placement location for the unique package first in sequence according to the processing order. The robotic system 100 can determine the initial placement location according to a predetermined pattern as described above. In some embodiments, the robotic system 100 can calculate initial placements for each unique package. The resulting initial placements can each be developed into a unique placement combination (e.g., an instance of the search tree 374 of FIG. 3C), such as by tracking the placement plan 350 across iterations. At block 638, the robotic system 100 can derive and track candidate placement locations for the subsequent packages according to the processing order and/or the remaining packages 372 as described above. Accordingly, the robotic system 100 can iteratively derive the placement combinations 364 of FIG. 3C.

In deriving the placement combinations 364 (e.g., candidate placement locations), the robotic system 100 can test/evaluate locations of the discretized object model 302 of the corresponding package based on iteratively deriving and evaluating candidate stacking scenarios (e.g., potential combinations of unique placement locations for the available packages). The candidate stacking scenarios can each be derived based on identifying unique potential locations (e.g., according to a predetermined sequence/rule for placement locations) for the packages according to the above discussed sequence. The candidate stacking scenarios and/or the unique placement locations can be evaluated according to one or more placement criteria (e.g., requirements, constraints, placement costs, and/or heuristic scores). For example, the placement criteria can require that the discretized object models 302 entirely fit within horizontal boundaries of the discretized platform model 304 when placed at the selected location. Also, the placement criteria can require that placement of the discretized object models 302 be within or over a threshold distance relative to the initial placement location (e.g. such as along a horizontal direction) and/or the previous placement location, such as for adjacent placements or separation requirements. Other examples of the placement criteria can include preferences for adjacently placing packages having smallest difference(s) in one or more package dimensions (e.g., height), the fragility ratings, the package weight ranges, or a combination thereof. In some embodiments, the placement criteria can include collision probabilities that can correspond to locations and/or characteristics (e.g., height) of previously assigned packaged in the layer relative to a reference location (e.g., location of the palletizing robot). Accordingly, the robotic system 100 can generate multiple unique placement combinations (i.e., candidate placement plans for each layer and/or the candidate stacking scenarios that each layer includes multiple layers) of package placement locations. In some embodiments, the robotic system 100 can track the placements of the combination based on generating and updating the search tree 374 across the placement iterations.

At block 640, the robotic system 100 can calculate/update a placement score for each combination/package placement. The robotic system 100 can calculate the placement score according to one or more of the placement conditions/preferences (e.g., package dimensions, collision probabilities, fragility ratings, package weight ranges, separation requirements, package quantity conditions). For example, the robotic system 100 can use preference factors (e.g., multiplier weights) and/or equations to describe a preference for: separation distances between packages, differences in package dimensions/fragility ratings/package weights for adjacent packages, the collision probabilities, continuous/adjacent surfaces at the same height, a statistical result thereof (e.g., average, maximum, minimum, standard deviation, etc.), or a combination thereof. Each combination can be scored according to the preference factors and/or the equations that may be predefined by a system manufacturer, an order, and/or a system operator. In some embodiments, the robotic system 100 can calculate the placement score at the end of the overall placement iterations.

In some embodiments, the robotic system 100 can update the sequence of the placement combinations 364 in the priority queue 376 of FIG. 3C after each placement iteration. The robotic system 100 can update the sequence based on the placement score.

The robotic system 100 can stop the placement iterations, such as when one candidate placement plan is finished, based on determining an empty source status, a full layer status, or an unchanged score status. The empty source status can represent that all of the available packages have been placed. The full layer status can represent that no other package can be placed in the remaining areas of the considered discretized platform model 304. The unchanged score status can represent that the placement score for the combination remains constant across one or more consecutive placement iterations. In some embodiments, the robotic system 100 can repeat the placement iterations using different initial placement locations and/or different processing order (e.g., for reordering groups having same sequencing value/score associated with the sequencing conditions) to derive other instances of the candidate stacking scenarios. In other words, the robotic system 100 can generate multiple 2D placement plans, where each 2D placement plan can represent a layer within a 3D stack (e.g., an instance of the candidate stacking scenarios). In other embodiments, the robotic system 100 can iteratively consider the 3D effect as a 2D placement plan is derived and begin deriving the next layer as a next iteration when the 2D placement plan becomes full.

At block 612, the robotic system 100 can generate a stacking plan (e.g., the stacking plan 502). In some embodiments, the robotic system 100 can begin generating the stacking plan 502 when the placement location of the processed package overlaps one or more previously placed/processed packages.

In generating the stacking plan 502 and/or assessing the 2D plans, the robotic system 100 can convert each of the placement combinations 364 and/or the placement plans into 3D states as illustrated at block 652. For example, the robotic system 100 can assign the height values for the packages to the placement combinations 364. In other words, the robotic system 100 can generate a contour map (an estimate of a depth map) based on the adding the package heights to placement combinations 364.

With the 3D states, the robotic system 100 can evaluate the placement combinations 364 according to one or more stacking rules (e.g., the horizontal offset rule 402 of FIG. 4A, the support separation rule 404 of FIG. 4B, and/or the vertical offset rule 406 of FIG. 4C). As an illustrative example, when the placed package is stacked on/over one or more previously processed packages, the robotic system 100 can eliminate any of the placement combinations 364 that violate the overlap requirement 422 of FIG. 2, the overhang requirement 424 of FIG. 4A, the vertical offset rule 406, the CoM offset requirement 426 of FIG. 4A, or a combination thereof described above. In one or more embodiments, the robotic system 100 can eliminate any of the placement combinations 364 that violate fragility ratings of one or more packages under the processed package, such as by estimating the supported weights at the overlapped packages and comparing them to the corresponding fragility ratings.

For the remaining placement combinations 364, the robotic system 100 can calculate 3D placement scores or update the placement score, such as illustrated at block 654. The robotic system 100 can use predetermined preferences (e.g., weights and/or equations) associated with placement costs and/or heuristic values for 3D placements. The predetermined 3D preferences can be similar to the 2D preferences, grouping preferences, sequencing conditions, or a combination thereof. For example, the 3D preferences can be configured to calculate collision probabilities based on the 3D state and to calculate scores that favor the placement combinations with lower collision probabilities. Also, the robotic system 100 can calculate the scores based on the remaining packages 372, sizes of support areas with common height, number of packed items in the 3D state, difference between the heights of the processed packages, or a combination thereof. In some embodiments, the robotic system 100 can update the sequence of the placement combinations 364 in the priority queue 376 according to the scores.

After the 3D states have been processed, the robotic system 100 can update the 2D plans by deriving a placement for the next package in the remaining packages 372, such as at block 610. The robotic system 100 can repeat the above-described process until a stopping condition, such as when all of the available packages 362 have been processed (i.e., empty value/set for the remaining packages 372) and/or when the placement combinations 364 cannot be improved (also referred to as unimproved combinations). Some examples of unimproved combinations can include when the currently processed placement eliminates the last of the placement combinations 364 in the priority queue 376 due to one or more of the violations and/or when the placement score remains constant for the preferred combinations across a threshold number of iterations.

When the stopping condition is detected, such as at block 656, the robotic system 100 can select one of the derived placement combinations 364 according to the placement scores (e.g., the 2D and/or the 3D related scores). Accordingly, the robotic system 100 can designate the selected placement combination as the stacking plan 502 (e.g., a set of the placement plans 350).

In some embodiments, as an illustrative example, the robotic system 100 can implement the functions of block 610 and 612 differently. For example, at block 610, the robotic system 100 can generate the 2D plan (e.g., an instance of the placement plan 350) for a bottom layer as described above. In doing so, the robotic system 100 can be configured to place heavier preference (e.g., greater parameter weights) for matching package heights, heavier package weights and/or greater supportable weight for the packages in considering the placements and/or the processing order. The robotic system 100 can derive the first 2D plan for the base layer as described above for block 610.

Once the first 2D layer is complete/full as described above, thereby forming the base layer, the robotic system 100 can convert the placement plan into 3D states as described for block 612/652. Using the 3D information, the robotic system 100 can identify one or more planar sections/areas (e.g., the placement surfaces 352-356 of FIG. 3B) of the base layer as described above. Using the planar sections, the robotic system 100 can iteratively/recursively derive package placements for the next layer above the base layer. The robotic system 100 can consider each of the planar sections as new instances of the discretized platform models 304 and test/evaluate different placements as described above for block 610. In some embodiments, the robotic system 100 can derive the 2D placements using the placement surfaces but calculate the score across the entirety of the placement pallet 340. Accordingly, the robotic system 100 can be configured to follow preferences for larger placement areas for subsequent layers without being limited to the preceding placement areas.

Once the iterative placement process stops for the second layer, the robotic system 100 can calculate planar sections (e.g., top surfaces having heights within a threshold range) for the derived layer to generate the 2D placements of the remaining packages/groupings for the next above layer. The iterative layering process can continue until the stopping condition has been met as described above.

In some embodiments, the robotic system 100 can separately generate 2D plans (e.g., two or more of the placement plans 350) at block 612. The robotic system 100 can generate the stacking plan 502 based on vertically combining (e.g., arranging/overlapping the 2D placement plans along a vertical direction) the 2D plans.

At block 614, the robotic system 100 can calculate a packing sequence (e.g., the stacking sequence 530 of FIG. 5B) based on the stacking plan 502. As an example, the packing sequence can be for identification of the placing order of the available packages 362. In some embodiments, as illustrated at block 662, the robotic system 100 can calculate the packing sequence layer-by-layer. In other words, the robotic system 100 can calculate the packing sequence for each layer and then connect the sequences according to the order/position of the layers from bottom to top. In calculating the packing sequence, in some embodiments, the robotic system 100 can adjust the placement plans as illustrated at block 672. For example, the robotic system 100 can adjust the placement plans by reassigning one or more of the packages (e.g., packages with heights that increase the collision probabilities for subsequent manipulations/transfers) from a lower-layer placement plan to a higher-layer placement plan. Any packages supported by the reassigned package can also be reassigned to a further higher layer. In other words, the reassigned packages can remain at the same horizontal placement and be associated with a higher layer, such that the packages can be placed later as illustrated in FIG. 5B. At block 674, the robotic system 100 can calculate the packing sequence (e.g., the stacking sequence 530) based on the adjusted placement plan, such as by packing/manipulating objects that are assigned in the higher layers after the objects assigned in the lower layers.

In other embodiments, as illustrated at block 664, the robotic system 100 can calculate the packing sequence regardless/independent of the layer assignments. In other words, the robotic system 100 can calculate the packing sequence such that packages assigned to a lower layer may be placed after packages assigned to a higher layer.

In calculating the packing sequence, both within or across layers, the robotic system 100 can analyze the locations of the packages in the stacking plan 502 according to one or more package dimensions (e.g., heights), relative placement locations, or a combination thereof. For example, the robotic system 100 can sequence placements of boxes further away from a unit/reference location (e.g., location of the palletizing robot) before closer assigned packages. Also, the robotic system 100 can place the taller/heavier packages earlier when their assigned locations are along the perimeters of the placement plan and away from the unit location.

At block 616, the robotic system 100 can implement the stacking plan 502 for placing the available packages 362 on the platform. The robotic system 100 can implement the stacking plan 502 based on communicating one or more motion plans, actuator commands/settings, or a combination thereof to the corresponding device/unit (e.g., the transfer unit 104 of FIG. 1, the actuation devices 212 of FIG. 2, the sensors 216 of FIG. 2, etc.) according to the stacking plan 502. The robotic system 100 can further implement the stacking plan 502 based on executing the communicated information at the devices/units to transfer the available packages 362 from a source location to the destination platform. Accordingly, the robotic system 100 can place the available packages 362 according to the 3D mapping, where one or more of the available packages 362 are placed/stacked on top of other packages, such as placing the available packages 362 layer-by-layer. Further, the robotic system 100 can manipulate/transfer the packages according to the packing sequence. As such, the robotic system 100 can place the packages layer-by-layer or without such restrictions as described above.

Discretization of the tasks and the 2D/3D layering described above provides improved efficiency, speed, and accuracy for packing objects. Accordingly, the reduction in operator inputs and the increase in accuracy can further decrease human labor for the automated packing process. In some environments, the robotic system 100 as described above can eliminate the necessity of sequencing buffers, which can cost around or over $1 million US.

Processing Packages

By using a temporary storage area for storing the available packages 362, identifying the available packages 362 in real-time, and generating a simulated stacking plan for the available packages 362 in real-time, e.g., as the packages arrive at the start location 114, the robotic system 100 can eliminate the need for the available packages 362 to be (a) labeled with identifying attributes (e.g., using a bar code) before being provided to the robotic system 100 and (b) received in a stacking sequence, which also eliminates the need for separate sequencing machines. Therefore, by minimizing consumption of resources, and improving the packing mechanism the disclosed embodiments result in an improved robotic system.

Figure 7:
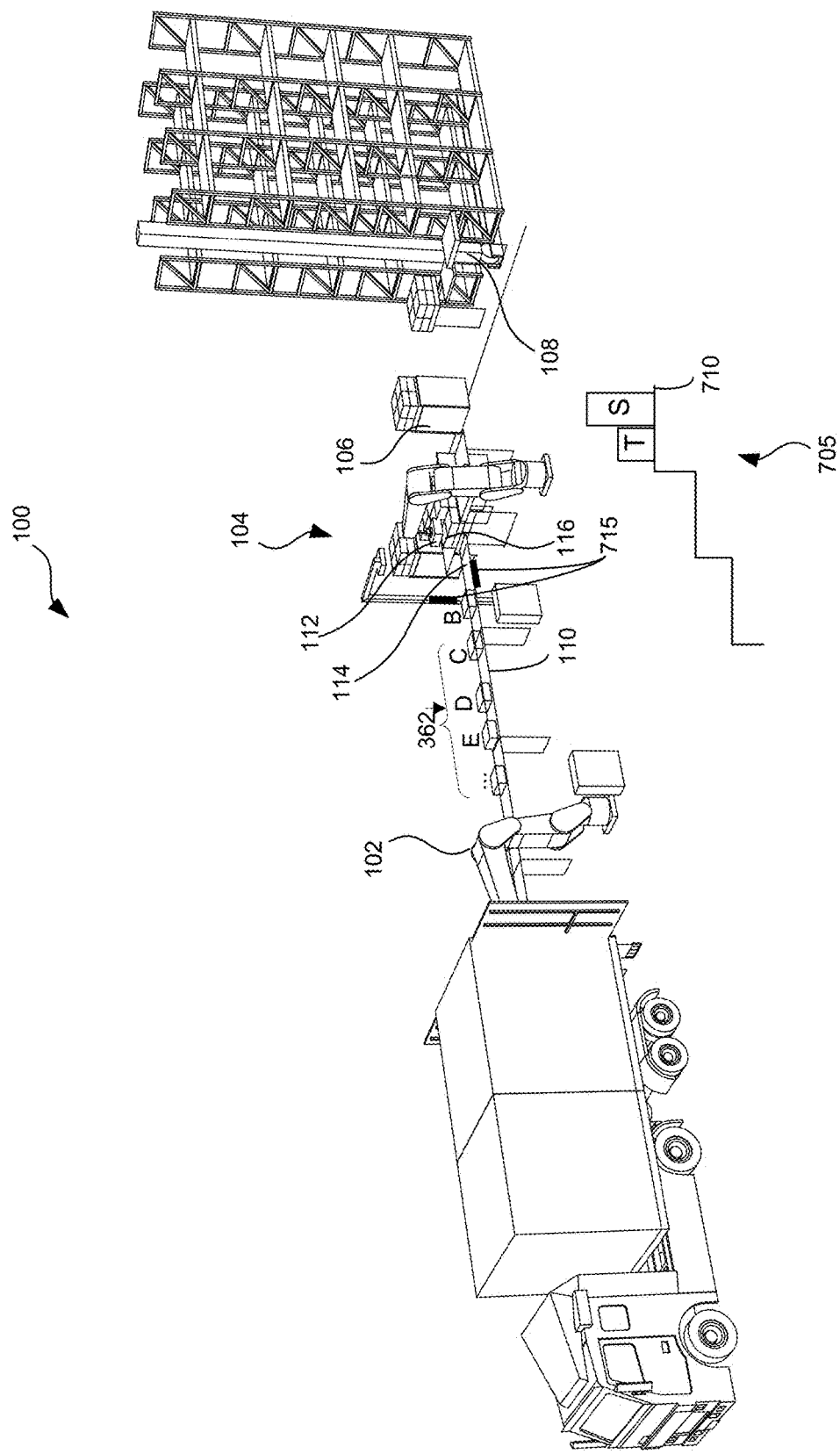
FIG. 7 is an example environment in which the robotic system may operate to process packages for placement on a platform using a simulated stacking plan.

FIG. 7 is an example environment in which the robotic system 100 may operate to process packages for placement on a platform using a simulated stacking plan, which will be discussed in detail below. The robotic system 100 can be used for processing packages for placement at a particular destination, e.g., a warehouse or a carrier. The robotic system 100 in the example of FIG. 7 is illustrated as palletizing the packages from a carrier and placing the palletized packages in a warehouse. However, the robotic system 100 can also be implemented for placement of the packages into a carrier, e.g., truck, from the warehouse.

In some implementations, the transfer unit 104 of the robotic system 100 can receive a set of packages from the unloading unit 102 for placement at the task location 116 (also referred to as a pallet or a platform). As an example, the set of packages can include all the possible instances of the available packages 362 that can be received by the robotic system 100 for placement on the task location 116. In some embodiments, the robotic system 100 can be provided with prior knowledge of the set of packages, such as the total number of the available packages 362 that will arrive at the start location 114. In other embodiments, the robotic system 100 can have no prior knowledge of the set of packages and can operate without prior knowledge of the total number of the available packages 362 that will arrive at the start location 114.

The robotic system 100 can implement the transfer unit 104 to make use of a storage area 705, which is an area that is different from the task location 116, for temporarily storing one or more of the available packages 362 until the available packages 362 can be placed on the task location 116 according to the simulated stacking plan. The storage area 705 can be designed in one of many configurations that is suitable for the transfer unit 104 to place the packages in and/or retrieve the packages from. For example, the storage area 705 can be configured to include one or more storage racks 710 with shelves or placement locations that can be arranged in an Amphitheatre seating format or a staircase format. In another example, the storage racks 710 can be arranged as multiple rows and columns.

FIG. 7 illustrates an example of the available packages 362, e.g., packages "B"-"E," as part of the set of packages arriving one after the other in a sequence via a transport mechanism, such as a conveyor belt 110, at the start location 114 for processing by the robotic system 100. The instances of the available packages 362 located at the start location 114 can be referred to as the target object 112. The conveyor belt 110 can be configured to provide basic functions, such as on and off control and speed control. In some embodiments, the conveyor belt 110 does not provide built in or integrated intelligence capabilities and generally requires control and/or activation/deactivation of the operation functions by external systems or operators.

The robotic system 100 can include one or more three dimensional (3D) sensors 715 for scanning the available packages 362. For example, the conveyor belt 110 can be equipped with one or more of the 3D sensors 715 to generate sensor information, such as 3D point cloud information, that can be used by the robotic system 100 to calculate one or more package attributes associated with each of the available packages 362. Some examples of the package attributes calculated based on the sensor information from the 3D sensors 715 can include package dimensions (i.e. a package height, a package width, and a package length), and/or package orientation details. Additional details regarding the package attributes will be discussed in below. The placement of the 3D sensors 715 can be preconfigured. In some embodiments, the 3D sensors 715 can be installed near the start location 114. For example, the 3D sensors 715 can be positioned above the start location 114 and facing towards the top surface of the conveyor belt 110 to generate a top-down view of the available packages 362, and more specifically, the target object 112. As the available packages 362 pass the 3D sensors 715 one after the other, the 3D sensors 715 can scan the available packages 362 to generate the sensor information.

The transfer unit 104 can receive the available packages 362 that have been scanned by the 3D sensors 715 as the target object 112 and can store the target object 112 at a storage location in the storage area 705. The storage location is a physical location within the storage area 705, such as the specific instance of the storage racks 710 and/or position on a shelf of the storage racks 710, for placement and storage of objects, such as the available packages 362. Examples of the available packages 362 in the storage area 705 are illustrated by the available packages 362 labeled "S" and "T" that are positioned on the storage rack 710.

After placing the available packages 362 in the storage area 705, the robotics system 100 can record storage location information of the available packages 362, e.g., in the tracking data 254 of FIG. 2. The storage location information can be information about the storage location of the available packages 362 in the storage area 705. In some embodiments, the robotics system 100 can generate a data structure, referred to as a "storage map" that can be a representation of the storage area 705. The storage map can include storage entries, which can be the data entries of the data structure that correspond to each of the available objects 362 in the storage area 705. The storage entries in the storage map can store a package identification (ID), the storage location information, and/or the package attributes (e.g., physical dimensions) of each of the available packages 362 that are temporarily stored in the storage area 705. The package ID can be generated by the robotic system 100 (i.e. as an assigned value corresponding to the order in which the available packages 362 are received) or be determined from the package, e.g., from a bar code associated with the package, which can be automatically read while the package is being transported on the conveyor belt 110 using a bar code scanner (not illustrated).

In some embodiments, the robotic system can maintain a storage capacity counter for the storage area 705. On one implementation, the storage capacity counter can be a value that represents the amount of storage space or number of the storage locations in the storage area 705 that are currently occupied by the available packages 362. In another implementation, the storage capacity counter can be a value that represents the amount of storage space or number of the storage locations in the storage area 705 that are currently available for storage or unoccupied. As an example, the robotic system 100 can maintain the storage capacity counter by increasing or decreasing the value of the storage capacity counter when instances of the available packages 362 are added to or removed form the storage area 705.

In some embodiments, the robotic system 100 can generate package groupings for the available packages 362 stored in the storage area 715. For example, the robotic system 100 can generate the package groupings based on the package attributes, such as the package height and/or the package weight, of each of the available packages 362 stored in the storage area 715. Generation of the package groupings will be discussed in detail below.

The robotic system 100 can execute a simulation function to generate the simulated stacking plan for the available packages 362, and more particularly, for the available packages 362 that are currently stored in the storage area 705. In general, the aim of the robotic system 100 is to generate the simulated stacking plan to place at least a portion of the available packages 362 in the storage area 705 as a uniform packing layer using the available packages 362 such that the top surface of the uniform package layer is of the same height. In one example, the uniform packing layer can be generated as a single layer of the available packages 362 such that the package height of each of the available packages 362 in the uniform packing layer are the same (i.e. share the same or similar values of the package height). As a specific example, the simulation function can generate the simulated stacking plan based on the package groupings that are categorized according to the package height.

In another example, the uniform packing layer can be generated as a combination layer. In one embodiment, the uniform packing layer generated as the combination layer can be achieved as a combination of a single instances of the available packages 362 and a package stack of one or more of the available packages 362, where the package height of the single instance of the packages is the same as the sum of the package height of the one or more packages in the package stack (i.e. such that the top surface of the combination layer is of the same height). As an illustration, the combination layer can include a single instance of the available packages 362 (i.e. with a package height of "X") and the package stack of multiple instances of the available packages (i.e. two or more of the available packages 362 with a combine stack height, which is a sum of the package height for each of the available packages 362 in the package stack, totaling "X"), such that the top surface of the combination layer is of the same height (i.e. "X"). In another embodiment, the uniform packing layer generated as the combination layer can be achieved with multiple instances of the package stacks so long as the sum of the package height of the available packages 362 in each of the package stack is the same. Additional details regarding generation of the simulated stacking plan achieving the uniform packing layer as the combination layer will be discussed below. By generating the simulated stacking plan to include the uniform packing layer, the robotic system 100 can provide a stable base for stacking of additional layers of the available packages 362.

Generation of the simulated stacking plan to achieve the uniform packing layer can include meeting a stacking surface area requirement. The stacking surface area requirement can be a requirement for spacing and/or gaps between the available packages 362 forming the uniform package layer and/or a requirement for a combine horizontal area of the top surface of the available packages 362 forming the uniform package layer. The combine horizontal area of the top surface of the available packages 362 refers to the sum of the surface area of the top surface for each of the available packages 362 forming the top surface of the uniform packing layer. The stacking surface area requirement can include a combine area requirement and/or a package spacing requirement.

In some embodiments, the stacking surface area requirement of the combine area requirement can include that the combine horizontal area of the top surface of the uniform packing layer be greater than a surface area threshold. As an example, the surface area threshold can be based on a percentage of the horizontal placement surface of the task location 116. As another example, the surface area threshold can be predetermined, such as by the system user.

In another embodiment, the stacking surface area requirement of the package spacing requirement can include requiring that any gap regions and/or empty spaces between the available packages 362 that form the top surface of the uniform packing layer be less than a spacing threshold. As an example, the spacing threshold can be set dynamically by the robotic system 100 to be of an area that is less than an area calculated based on the package dimensions of any of the available packages 362 in the storage area 705. As such, the gap regions and/or empty spaces would not be large enough to allow any of the available packages 362 from falling between the available packages 362 that form the top surface of the uniform packing layer. In another example, the spacing threshold can be predetermined, such as by a system user.

Generating the simulated stacking plan that achieves the uniform packing layer meeting the stacking surface area requirement (i.e. both the combine area requirement and the package spacing requirement) provides the advantage of a stable surface for maximizing placement of additional instances of the available packages 362. For example, the robotic system 100 can then use the top surface of uniform package layer as new instances of the discretized platform models 304 having a maximized placement area to iteratively/recursively derive package placements for the next layer above uniform package layer.

It is understood that in some circumstances, the available packages 362 currently in the storage area 705 cannot be arranged by the simulation function to generate the simulated stacking plan that achieves the uniform packing layer. In these situations, the robotic system 100 can generate the simulated stacking plan as a remaining package plan. In some embodiments, the remaining package plan can be a plan to place all of the remaining instances of the available packages 362 currently in the storage area 705 onto the task location 116. The remaining package plan can be generated by the simulation function to meet one or more palletizing criterion for placing the available packages 362 on the task location 116.

The palletizing criterion can be requirements regarding the packing density and/or the number of the available packages 362 on the task location 116. As an example, the palletizing criterion can include requirements, such as a volumetric packing efficiency, an expected number of packages on the pallet, the maximum stackable height of a stack of the available packages 362 on the task location 116, or a combination thereof for placing the available packages 361 on the task location 116. The volumetric packing efficiency can be a relationship, such as a ratio, between the total volume of the available packages 362 and a packing volume capacity of the task location 116, which can be a value for the total volume objects or packages that can be borne by the task location 116. An example, the volumetric packing efficiency can be a ratio between the sum of the package volume of all the available packages 362 to be placed on the task location 116, (i.e. such as according to the simulated stacking plan) and the packing volume capacity of the task location 116. The expected number of packages can be a minimum number of the available packages 362 that are expected to be placed on the task location 116. The maximum stacking height can be a limit to the total height the stacked packages (e.g. the sum of the package heights for each of the available packages 362 when the available packages 362 are stacked one on top of one another) on the task location 116.

In some embodiments, the robotic system 100 can execute the simulation function in real-time, e.g., such as after a new instance of the available packages 362 arrives at the start location or is added to the storage area 705. For example, the robotic system 100 can execute the simulation function when a first package of the available packages 362 is scanned by the 3D sensors 715, and continues to update the simulated stacking plan as and when subsequent instances of the available packages 362 are received. As a specific example, when the first package "S" of the available packages 362 is stored in the storage area 705, the robotic system 100 can generate the simulated stacking plan based on the first package "S," and when the second package "T" of the available packages 362 is stored in the storage area 705, the robotic system 100 can update the simulated stacking plan based on the first package "S" and second package "T."

In some embodiments, updating the simulated stacking plan can include one or more of updating placement information, such as a sequence identification (ID) of the available packages 362, updating a placement location of the available packages 362 on the target location 114, and/or updating a placement orientation of the available packages 364. The sequence ID can indicate the order in which the available packages 362 are placed on the task location 116. In some embodiments, the placement information for the available packages 362 can be stored in the storage entries of the storage map. Further details regarding executing the simulation function to generate the simulated packing plan will be discussed below.

During the package processing operation, the robotic system 100 can determine the occurrence of a palletizing trigger. The palletizing trigger can be an event that can trigger placement of one or more of the available packages 362 from the storage area 705 onto the task location 116 by the robotic system 100 according to the simulated stacking plan. In some embodiments, the palletizing trigger can be based on an time limit trigger for one or more units of robotic system 100, a stacking plan trigger, a storage capacity trigger, or receiving a placement initiation command. The stacking plan trigger can occur when the simulation function generates or updates the simulated stacking plan achieving the uniform packing layer that meets the stacking surface area requirement.

The time limit trigger can be based on the unit operation time of the robotic system 100. In some implementations, the time limit trigger can be based on a shipping schedule (i.e. the time at which a fully loaded pallet must be shipped) for the available packages 362 to be placed on the task location 116. In another implementation, the time limit trigger can be based on the amount of time the robotic system 100 has spent not placing the available packages 362 on the task location 116. As an example, the time limit trigger can occur when the unit operation time exceeds an operation threshold. In some implementations, the unit operation time can be a duration of time for which the transfer unit 104 has not placed any of the available packages 362 on the task location 116. In other implementations, the unit operation time can be the total amount of time the transfer unit 104 has spent on palletizing operations for the current instance of the task location 116. The operation time threshold can be a pre-defined period of time that can be determined by the robotic system 100 or the system user based on the idle time requirements and/or the shipping schedule.

The storage capacity trigger can be based on the storage capacity counter. For example, the storage capacity trigger can occur when the storage capacity counter exceeds a storage capacity threshold. The storage capacity threshold can indicate that the storage area 705 is nearing the maximum storage capacity. For example, the storage capacity threshold can be a pre-defined value that represents a percentage or number of the storage locations in the storage area 705.

The placement initiation command can be an instruction or command to commence placement of the available packages 362 in the storage area 705 onto the task location 116. The placement initiation command can be an instruction received from the robotic system 100 or an instruction received from the system user. For example, the placement initiation command received from the system user can occur when the system user presses a button associated with the robotic system 100 to indicate that there are no more packages to be processed.

In some embodiments, when the robotic system 100 determines the occurrence of the time limit trigger, the storage capacity trigger, or receives the placement initiation command, the robotic system 100 may have to generate the simulated stacking plan as the remaining package plan for placement of the available packages 362 remaining in the storage area 705 on the task location 116 according to the palletizing criterion. Additional details regarding determining the occurrence of the palletizing trigger will be discussed below.

In some embodiments, a quantity of the available packages 362 in the set of packages is known to the robotic system 100 (e.g., via user input) prior to determining the simulated stacking plan. If the robotic system 100 knows the number of available packages 362 to be placed on the task location 116, the robotic system 100 may generate the simulated stacking plan considering the total number of the available packages 362 in the set of packages. However, in some embodiments, the quantity of available packages 362 is not known to the robotic system 100. Strategies for generating the simulated stacking plan can differ in both the cases, which can depend on factors such as the palletizing criterion. For example, if the robotic system 100 knows that there are 36 of the available packages 362 to be palletized, and if the expected number of packages on the pallet is set to 25, but a priority is set to maximize the volumetric packing efficiency, then assuming that each of the available packages 362 have the same or similar package dimensions, the robotic system 100 can generate two instances of the simulated stacking plan of 18 packages each for two pallets (e.g., so that the volumetric efficiency is equally utilized in both pallets) and start palletizing as soon as the simulated stacking plan identifies the first 18 suitable packages of the available packages 362 for placement. In contrast, if the number of the available packages 362 is not known to the robotic system 100 in advance, the robotic system 100 can store the available packages 362 in the storage area 705 until the palletizing trigger, such as the time limit trigger, the uniform layer trigger, or the storage capacity trigger, has occurred to start palletizing to the simulated stacking plan for placement of the 25 packages, which is the expected number of packages on the pallet, in which case one pallet can have 25 packages and another can have 11 packages.

Figure 8:
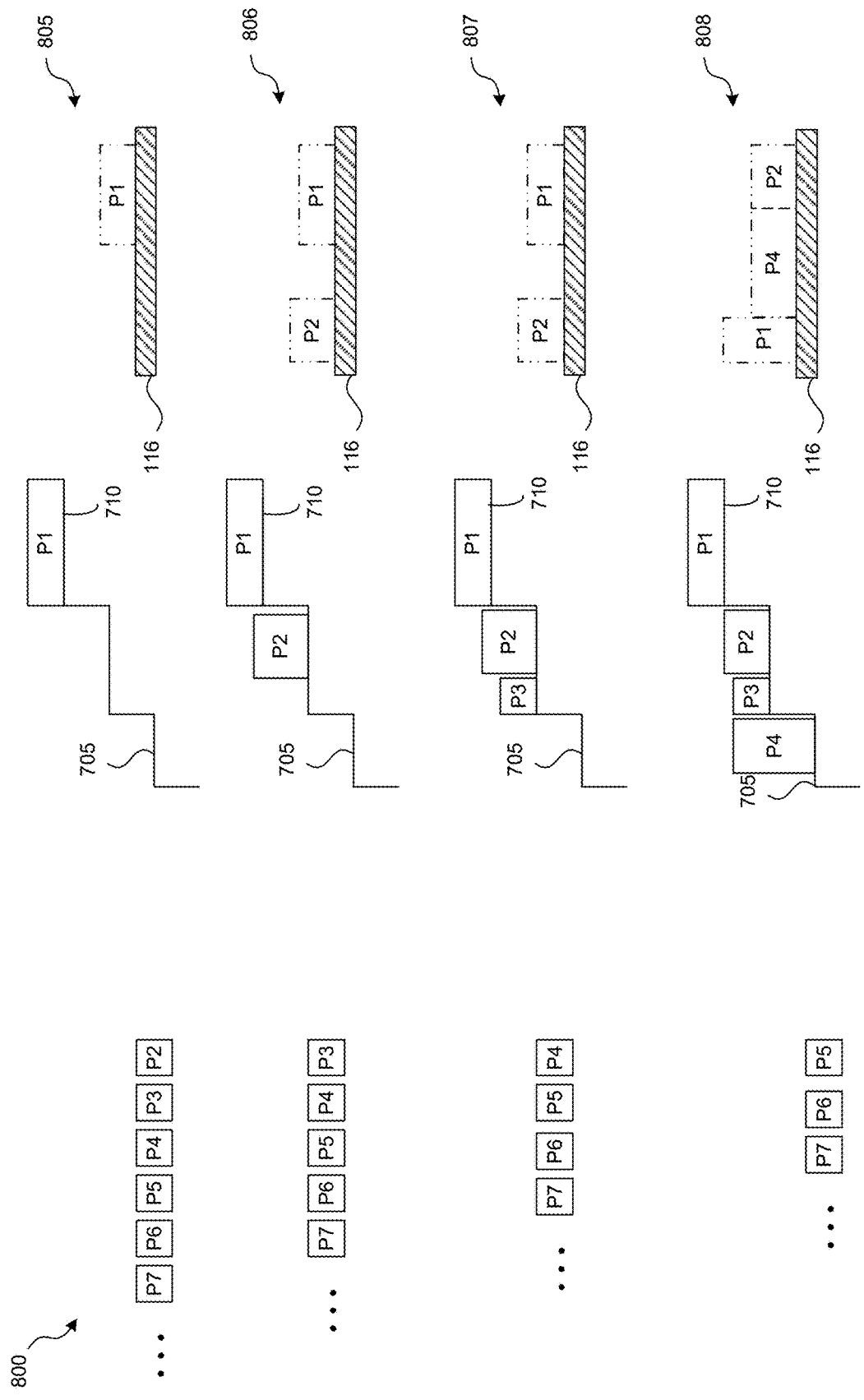
FIG. 8 is a block diagram illustrating an example of various stages in the placement of the available packages on the task location, consistent with various embodiments.
Figure 8:
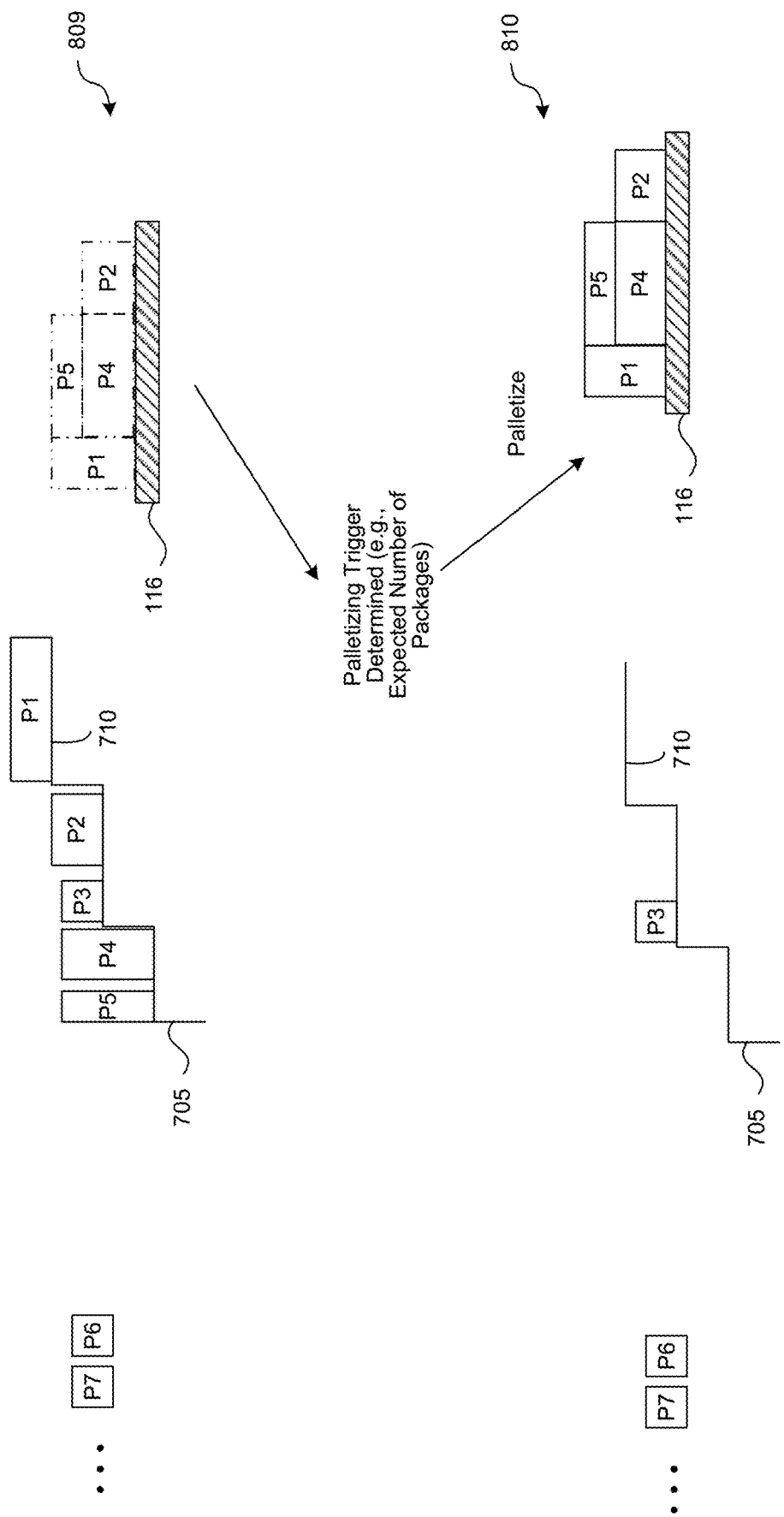
Figure 8:
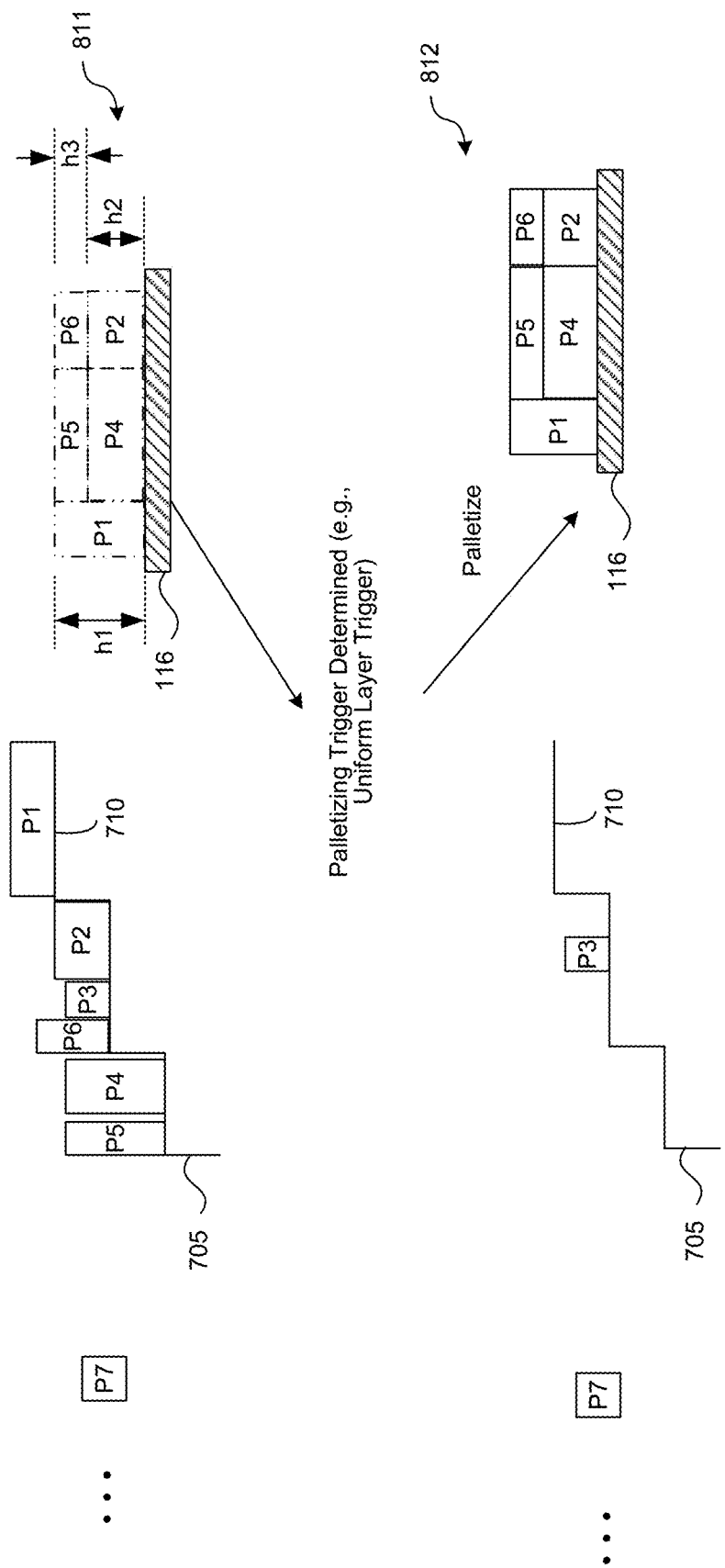

FIG. 8 is a block diagram illustrating an example 800 of various stages in the placement of the available packages 362 on the task location 116, consistent with various embodiments. In some embodiments, the example 800 can be implemented in the environment of FIG. 7. As described above, after the available packages 362 pass the 3D sensors 715 at or on their way to the start location 114, the robotic system 100 can determine the package attributes of the available packages 362, temporarily store the available packages 362 in the storage area 705, execute the simulation function to generate or update the simulated stacking plan based on the package attributes, determine the occurrence of the palletizing trigger, and proceed with palletizing the available packages 362 that are temporarily stored in the storage area 705 onto the task location 116. For example, when the first package "P1" of the available packages 362 passes the scanner 715, the robotic system 100 can determine the package attributes associated with the first package (e.g., physical dimensions of the package "P1") using the sensor information received from the 3D sensors 715, and stores the first package on the storage rack 710 of the storage area 705, as illustrated in first placement 805.

After placing the package "P1" on the storage rack 710 of the storage area 705, the robotic system 100 records the storage location information of the package "P1" in the storage map. The storage location information can include the storage location of the package "P1" in the storage area 705. The robotic system 100 can use the storage location information of the available packages 362 to generate instructions for the transfer unit 104 to retrieve the available packages 362 from the storage area 705, such as when moving the available packages 362 from the storage area 705 for placement on the task location 116. The robotic system 100 can also store the package ID (if any) and the package attributes, such as the physical dimensions (e.g., the package height, package length, and package width) and/or the package weight, in the storage map. The storage map can be part of the tracking data 254. The robotic system 100 can also execute the simulation function to determine the simulated stacking plan for placing the package "P1" on the task location 116 (e.g., pallet), as illustrated in the first placement 805. As an example, the simulated stacking plan, which can be generated after processing the first package "P1," indicates that the package "P1" is to be placed on the task location 116 in a specified corner of the task location 116 with the largest surface of the package "P1" being in contact with the task location 116. The robotic system 100 can determine the occurrence of the palletizing trigger, such as the time limit trigger, the uniform layer trigger, the storage capacity trigger, or receipt of the placement initiation command. In the first placement 805, the palletizing trigger has not occurred and therefore, the robotic system 100 proceeds with receiving the next package, "P2."

The robotic system 100 can continue processing the available packages 362 with a package "P2." For example, as the package "P2" arrives at the start location 114, the robotic system 100 determines the package attributes associated with the package "P2," and stores the package in the storage area 705, as illustrated in the second placement 806. The robotic system 100 records the storage location information and the package attributes of the package "P2" in the storage map. The simulation function updates the simulated stacking plan to include the package "P2" for placement on the task location 116 along with package "P1", as illustrated in the second placement 806. The robotic system 100 determines whether the palletizing trigger has occurred. In the second placement 806, the palletizing trigger has not occurred and therefore, the robotic system 100 proceeds with receiving the next package, "P3."

The robotic system 100 can continue the processing of the available packages 362 with a package "P3." For example, as the package "P3" arrives at the start location 114, the robotic system 100 determines the package attributes associated with the package "P3," and stores the package "P3" in the storage area 705, as illustrated in the third placement 807. The robotic system 100 records the storage location information and the package attributes of the package "P3"

in the storage map. The simulation function updates the simulated stacking plan to include the package "P3" for placement on the task location 116 along with packages "P1" and "P2." In some embodiments, the simulation function determines that a package is not suitable for placement on the task location 116 as yet (e.g., because the shape and size is not yet suitable for an efficient placement of the package with the other packages processed so far) and therefore, does not include the package in the stacking plan, as illustrated in the third placement 807. The robotic system 100 determines whether the palletizing triggering has occurred. In the third placement 807, the palletizing trigger has not occurred and therefore, the robotic system 100 proceeds with receiving the next package, "P4."

The robotic system 100 can continue the processing of the available packages 362 with a package "P4." For example, as the package "P4" arrives at the start location 114, the robotic system 100 determines the package attributes associated with the package "P4," and stores the package in the storage area 705, as illustrated in the fourth placement 808. The robotic system 100 records the storage location information and the package attributes of the package "P4" in the storage map. The simulation function updates the simulated stacking plan to include the package "P4" for placement on the task location 116 along with packages "P1"-"P3," as illustrated in the fourth placement 808. The fourth placement 808 illustrates updating the simulated stacking plan to rearrange the position and orientation of the packages "P1 and "P2" when simulating placement of "P4." More specifically, since the packages "P2" and "P4" have the same value "h1" of the package height, they can placed adjacent to one another to achieve the uniform packing surface, while "P1" is reoriented and repositioned at a different location on the task location 116. Note that the package "P3" is still not included in the stacking plan. The robotic system 100 determines whether the palletizing triggering has occurred. In the fourth placement 808, the palletizing trigger has not occurred and therefore, the robotic system 100 proceeds with receiving the next package, "P5."

The robotic system 100 can continue the processing of the available packages 362 with a package "P5." For example, as the package "P5" arrives at the start location 114, the robotic system determines the package attributes associated with the package "P5," and stores the package "P5" in the storage area 705, as illustrated in the fifth placement 809. The robotic system 100 records the storage location information and the package attributes of the package "P5" in the storage map. The simulation function updates the simulated stacking plan to include the package "P5" for placement on the task location 116 along with packages "P1"-"P4," as illustrated in the fifth placement 809. Note that the package "P3" is still not included in the stacking plan. The robotic system 100 determines if the stacking plan satisfies one or more palletizing criterion. In some embodiments, robotic system 100 determines that in the fifth placement 809, the palletizing trigger of the expected number of packages (e.g. 5 packages) has occurred along with meeting palletizing criterion of the volumetric packing efficiency. Accordingly, the robotic system 100 proceeds with placing the packages "P1," "P2," "P4," and "P5" on the task location 116, as illustrated in palletizing operation 810.

In some embodiments, the robotic system 100 can have a different value for the expected number of the packages (e.g. more than 5 of the available packages 362) and determines that the palletizing trigger has not occurred in the fifth placement 809. Accordingly, the robotic system 100 proceeds with receiving the next package "P6." For example, as the package "P6" arrives at the start location 114, the robotic system 100 determines the package attributes associated with the package "P6," and stores the package "P6" in the storage area 705, as illustrated in the sixth placement 811. The robotic system 100 records the storage location information and the package attributes of the package "P6" in the storage map. The simulation function updates the simulated stacking plan to include the package "P6" for placement on the task location 116 along with packages "P1"-"P5," as illustrated in the sixth placement 811. Note that the package "P3" is still not included in the stacking plan. The robotic system 100 determines whether the palletizing trigger has occurred. In some embodiments, robotic system 100 determines that the palletizing trigger of the uniform layer trigger has occurred since the simulated stacking plan has achieved the uniform packing layer as the combination layer. More specifically, the simulated stacking plan of the sixth placement 811 achieved the uniform packing layer since the package stack of "P4" and "P5" and the package stack of "P2" and "P6" each have the sum (i.e. the sum of "h2" and "h3") of the package height totaling "h1", which matches with the package height "h1" of package "P1" to provide the combination layer (i.e. the top surface of the packages forming the uniform packing layer are at the same height). Accordingly, the robotic system 100 proceeds with placing the packages "P1," "P2," and "P4"-"P6" on the task location 116, as illustrated in palletizing operation 812. The robotic system 100 can determine the storage location of the packages "P1," "P2," and "P4"-"P6" in storage area 705 using the storage map and retrieve them from the storage area 705 accordingly (i.e. based on the sequence ID for each of the packages) for placement on the task location 116. The package "P3" still remains in the storage area 705 and can be considered for placement on the task location 116 with the packages that are processed subsequently, e.g., package "P7" and so on.

In some embodiments, the robotic system 100 may manipulate the conveyor belt 110, such as stop or start, or change (i.e. reduce or increase) a speed of the conveyor belt 110. For example, when the robotic system 100 determines that a portion of the available packages 362 stored in the storage area 705 are to be palletized, the robotic system 100 may have to stop or reduce the speed of the conveyor belt 110 so that the processing of the next instance of the available packages 362 is delayed until the available packages 362 to be palletized are placed on the task location 116. The robotic system 100 may start or increase the speed of the conveyor belt 110 to deliver the next available package after the palletizing operation is complete.

Figure 9:
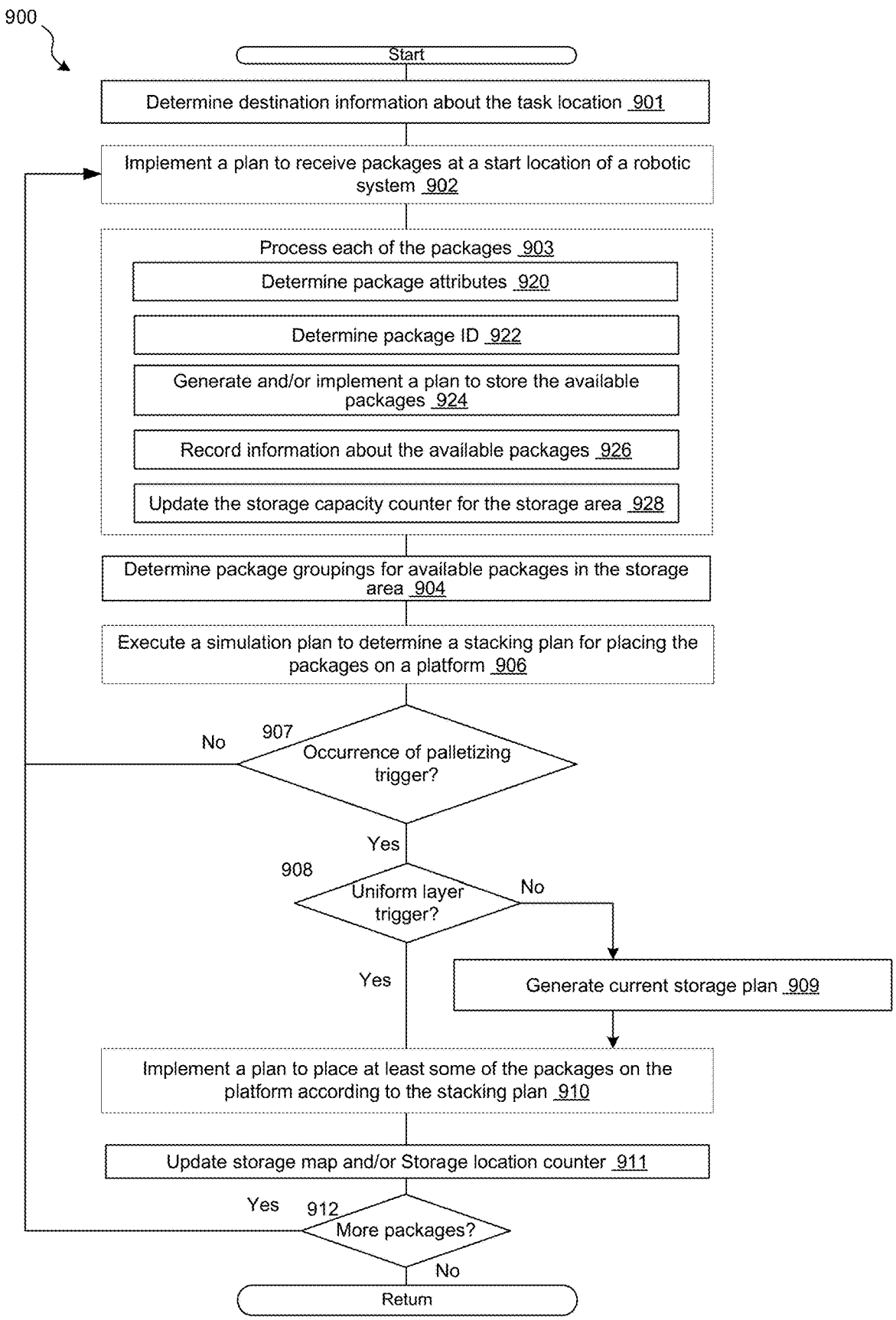
FIG. 9 is a flow diagram of a process for placement of available packages on a task location using a temporary storage area, consistent with various embodiments.

FIG. 9 is a flow diagram of a process 900 for placement of available packages on a task location using a temporary storage area, consistent with various embodiments. In some embodiments, the process 900 can be implemented in the environment of FIGS. 1 and 7. Further, in some embodiments, the package placement described at least with reference to FIG. 8 is an illustrative example of the process 900. The process 900 can be implemented based on executing the instructions stored on one or more of the storage devices 204 of FIG. 2 with one or more of the processors 202 of FIG. 2.

The robotic system 100 can initiate the process for placement of the available packages 362 of FIG. 3 at block 901. As illustrated in block 901, the robotic system 100 can determine destination information about the task location 116 of FIG. 7 (e.g. a pallet, a platform, a bin, and/or a container for receiving/placement of the available packages 362). For example, the destination information for the task location 116 can include the physical dimensions, the packing volume capacity, the maximum stacking height, or a combination thereof. In one embodiment, the robotic system 100 can determine the destination information to include a size or a dimension of a placement surface of the task location 116 where the available packages 362 can be placed (e.g., a top loading surface of the pallet, such as the placement pallet 340 of FIG. 3).

In another embodiment, the robotic system 100 can determine the destination information to include the packing volume capacity of the task location 116. For example, the packing volume capacity can be a predetermined value received by the computing system 100, stored within the master data 252, or calculated in real time by the computing system 100, such as by the horizontal dimensions (i.e. x and y dimensions) of the placement surface multiplied by a packing height (i.e. z dimension) for task location 116. As an example, the packing height dimension for the task location 116 can be a value corresponding to the configuration of the task location 116, such as the height of the walls for a bin or a maximum height correlated to stable stacking of objects on a pallet. In another example, the packing height dimension for the task location 116 can correspond to the maximum stacking height of the task location 116.

In a further embodiment, the robotic system 100 can determine the destination information to include the discretized platform models 304 of FIG. 3B corresponding to the task location 116. For example, the robotic system 100 can generate (e.g., offline or in real-time) the discretized platform models 304 based on dividing physical dimensions of the task location 116 (e.g., the pallet top surface) according to the unit pixel 310 of FIG. 3B. The unit pixel 310 can be a predetermined value or dimension (by, e.g., a manufacturer, an ordering customer, and/or an operator), such as at 1 millimeters (mm) or $1/16$ inches (in) or greater (e.g., at 5 mm or 20 mm). In some embodiments, the unit pixel 310 can be based on a dimension or a size of the platform (e.g., a percentage or a fraction).

At block 902, the robotic system 100 can generate and/or implement a plan to receive the set of packages, including one or more of the available packages 362, at the start location 114 of FIG. 7. For example, the plan to receive the set of packages can include instructions to receive one of the available packages 362 after another at the start location 112, which can be transported by the conveyor belt 110 of FIG. 7 to the start location 114. The plan to receive the set of packages can include identifying the instance of the available packages 362 currently at the start location 114 as the target object 112 of FIG. 7.

At block 903, the robotic system 100 can generate and/or implement a plan to process each of the available packages 362 in a series. For example, the plan to process the available packages 362 can include determining the package attributes of the available packages 362, and more specifically the target object 114, and storing the available packages 362 in the storage area 705 of FIG. 7. In one implementation, the plan to process the available packages 362 can include a block 920 for determining the package attributes, a block 922 for determining a package identification (ID) of the available packages 362, a block 924 for storage of the available packages 362 in the storage area 705, a block 926 for recording information for the available packages 362, a block 928 for updating the storage capacity counter, or a combination thereof.

As illustrated in the block 920, the robotic system 100 can determine the package attributes of the target object 112. The package attributes can include one or more properties characterizing or related to a shape, size, package dimensions (i.e. height, width, length, circumference, diameter) weight, other physical properties of the target object 114, the location and/or position of the target object 112 at the start location 114, separation between the target object 112 and adjacent instances of the available packages 362, or a combination thereof.

In some embodiments, the robotic system 100 can determine the package attributes of the target object 112 to include the package dimensions based on sensor information (i.e. the 3D point cloud information) received from the sensor 216 of FIG. 2 (e.g., the 3D sensors 715 of FIG. 1). As one example, the robotic system 100 can analyze the sensor information to determine the package attribute of the package length and/or the package width based on the measurements of detected edges in the 3D point cloud corresponding to the target object 114 (i.e. the length and width corresponding to the top surface of the target object 112 with respect to a top down perspective of the target object 114). Similarly, the robotic system 100 can analyze the sensor information to determine the package attribute of the package circumference or package diameter for the target object 112 with a cylindrical shape. In another example, the robotic system 100, can analyze the sensor information to calculate the package attributes of the package height based on the difference between 3D point cloud values corresponding to the surface of the target object 112 closest to/facing the 3D sensor 705 (i.e. the top surface of the target object 112) and the surface of the conveyor belt 110 closest to/facing the 3D sensor 705 (i.e. the top surface of the conveyor belt 110).

In some embodiments, the robotic system 100 can determine the package attributes to include the discretized object models 302 of FIG. 3A. For example, the robotic system 100 can generate and/or access the discretized object models 302 corresponding to the target object 112 based on the package dimensions. In some embodiments, the robotic system 100 can generate (e.g., offline or in real-time, such as after receiving the available packages 362 and/or prior to beginning the packing operation) the discretized object models 302 based on dividing physical dimensions of the target object 112. The unit pixel 310 can be a predetermined value dimension (by, e.g., a manufacturer, an ordering customer, and/or an operator), such as at 1 mm or $1/16$ in or greater (e.g., at 5 mm or 20 mm). In some embodiments, the unit pixel 310 can be based (e.g., a percentage or a fraction) on a dimension or a size of one or more of the available packages 362. In some embodiments, the robotic system 100 can access the discretized object models 304 stored in the storage devices 204 and/or another device (e.g., a storage device, a database, and/or a server of a package supplier accessed via the communication devices 206 of FIG. 2).

As illustrated in the block 922, the robotic system 100 can determine the package ID of the target object 112. For example, the package ID can be generated by the robotic system 100 such as an assigned value according to the order in which the available packages 362 are received at the start location 114. As another example, the package ID can be determined from the package, e.g., from a bar code associated with the package, which can be automatically read using a bar code scanner (not illustrated).

As illustrated in the block 924, the robotic system 100 can generate and/or implement a plan to store the available packages 362 (i.e. the target object 112) in the storage area 705. For example, the robotic system 100 can generate the plan to store the target object 112 to include instructions for the transfer unit 104 to grasp, transport, and place the target object 112 at the storage location in the storage area 705 that is not occupied by another instance of the available packages 362.

The plan to store the available packages 362 in the storage area 705 can, in some embodiments, include instructions for the transfer unit 104 to place the available packages 362 in the storage area 705 in various arrangements. For example, the instructions can include for the transfer unit 104 to place the packages laterally (i.e. one next to the other) on one of the storage racks 710 before moving onto another of the storage racks 710. In another example, the instructions for the transfer unit 104 can be to place the packages in the storage area 705 randomly. In yet another example, the instructions can be generated as placement plans, such as the placement plans described at least with reference to FIGS. 3A-3C, for placing the available packages 362 in the storage area 705. The placement plans may consider the number of the storage racks 710, the dimensions of the storage racks 710, weight bearing capacity of the storage racks 710, or other factors for placing the available packages 362 in the storage area 705. Regardless, the available packages 362 can be placed in the storage area 705 such that the transfer unit 104 can make efficient use of the available storage space in the storage 705 for storing and/or retrieving one or more of the available packages 362.

In some embodiments, the robotic system 100 can determine the package attributes to include the package weight of the target object 112 during transport of the target object 112. For example, the robotic system 100 can calculate the package weight based on sensor information received from the sensors 216 of FIG. 2 (e.g. torque or force sensors) of the transfer unit 104 during an initial lift of the target object 112.

As illustrated in the block 926, the robotic system 100 can record information about the available packages 362 that are transferred to the storage area 705. For example, the robotic system 100 can record the storage location information of the available packages 362 in the storage map. The storage location information can be information that corresponds to the storage location of the available packages 362 in the storage area 705, which can be determined using 2D and/or 3D sensors. The robotic system 100 can store the package attributes, the package ID, or a combination thereof for each of the available packages 362. For example, the robotic system 100 can store the package attributes and the package ID that correspond to the target object 112 as the storage entry representing the target object 112 in the master data 252.

At block 928, the robotic system 100 can update the storage capacity counter for the storage area 705. As example, the robotic system 100 can update the storage capacity counter by increasing the value of the storage capacity counter corresponding to the number of the available packages 362 that are added to the storage area 705.

At a block 904, the robotic system 100 can determine the package groupings (e.g., subgroupings of the available packages) for the available packages 362 that are currently stored in the storage area 705. For example, the robotic system 100 can determine the package groupings according to similarities in the package attributes of the available packages 362 that are currently in the storage area 705. In particular, the robotic system 100 can determine the packaging groupings according to the package height. In other words, each of the available packages 362 in one of the package groupings will be of the same (or similar) value of the package height as the other instances of the available packages 362 within the package grouping. The robotic system 100 can update one of more of the package groupings as the available packages 362 are moved into and out of the storage area 705. For example, during processing of the target object 112 (i.e. before, during, or after the target object 112 is moved to the storage area 705), the robotic system 110 can compare the package height of the target object 112 to the package height of the package groupings. If the robotic system 100 determines a match between the package height of the target object 112 and the package height of one of the package groupings, the robotic system 100 can add the target object 112 to the particular one of the package groupings. Otherwise, the robotic system 100 can create a new instance of the package groupings corresponding to the package height of the target object 112, which can be subsequently added to with additional instances of the available packages 362 with the package height of the same value.

At block 906, the robotic system 100 can execute the simulation function to generate or update the simulated stacking plan for the available packages 362 that are currently stored in the storage area 705. The simulated stacking plan includes details regarding arrangement of the available packages 362 on the task location 116. The simulated stacking plan can also include information regarding a stacking sequence ID in which the available packages 362 are to be placed on the task location 116, such as the pallet or platform.

The robotic system 100 can iteratively generate or update the simulated stacking plan when the available packages 362 arrive at the start location 114, after one of the available packages 362 is added to the storage area 705, categorized into one of the package groupings, or a combination thereof. In one embodiment, the robotic system 100 can execute the simulation function independently for each of the package groupings based on the package height to generate the simulated stacking plan that achieves the uniform package layer. In the case of generating the uniform packing layer as the single layer of the available packages, for example, the robotic system 100 can generated the simulated stacking plan as 2D plans (e.g., the placement plans 350 of FIG. 3B) for placing the available packages 362 along a horizontal plane based on the discretized models. For example, the robotic system 100 can generate the placement plans 350 based on comparing the discretized object models 302, that correspond to the available packages 362 belonging to one of the package groupings, to the discretized platform model 304. The robotic system 100 can determine different placements/arrangements of the discretized object models 302, overlap/compare them to the discretized platform model 304, and validate/retain the arrangements that are within the boundaries of the discretized platform model 304 when overlapped.

In another embodiment, in the case of generating the simulated stacking plan to achieve the uniform packing layer as the combination layer, the robotic system 100 can execute the simulation function independent of the package groupings. For example, the robotic system 100 can execute the simulation function to consider package dimensions (i.e. the package length, package width, package height) for each of the available packages 362 currently in the storage area 705 in different orientations (i.e. rotating the packages in three dimensions) when there are no orientation restrictions for the available packages 362 (i.e. the available packages 362 must be placed with a specific surface facing up/away from or facing down/towards the placement surface of the task location 116). To further the example, the robotic system 100 can execute the simulation function to consider the sum of the package heights of one or more package stacks of the available packages 362, which can be compared to the package dimensions of other instances of the available packages 362 to determine whether the combination layer can be achieved (e.g. as illustrated in placement 811 of FIG. 8). More specifically, the simulation function can generate the simulated stacking plan to consider combinations of single instances of the available packages 362 in different orientations placed on the task location 116 with the package stacks of one or more of the available packages 362, where the package height of the single instance of the packages is the same as the sum of the package height of the one or more packages in the package stack. Similarly, the combination layer can be achieved with multiple instances of the package stacks so long as the sum of the package height of available packages 362 in the package stack is the same. Note that the package height is determined as the package dimension that is perpendicular to the plane of the placement area of the task location 116, which can be regardless of the package height that was determined based on the sensor information (i.e. at the block 920).

Accordingly, to determine whether the simulated stacking plan has achieved the uniform packing layer, the robotic system 100 can iteratively derive placement locations for each of the available packages 362 (e.g. such as according to the discretized object models 302), particularly after a new instance of the available packages 362 is added to the storage area 705, until the stacking surface area requirement, including the combine area requirement and/or the package spacing requirement, is met. As an example, for the combine area requirement, the robotic system 100 can calculate the combine horizontal area as the sum of top surface area for each of the available packages 362 used to form the top surface of the uniform packing layer (which may currently be in an incomplete state) after one of the available packages 362 is added to the simulated stacking plan. The robotic system 100 can determine that the uniform packing layer has met the combine area requirement when the sum of top surface area for each of the available packages 362 used to form the top surface of the uniform packing layer exceeds the surface area threshold.

As another example, for the package spacing requirement, following each iteratively derived placement of the available packages 362 to the simulated stacking plan, the robotic system 100 can identify and compare each of the gap regions and/or open spaces between the available packages 362 to the spacing threshold. The robotic system 100 can determine that the uniform packing layer has met the package spacing requirement when each of the gap regions and/or open spaces is less than the spacing threshold.

At block 907, the robotic system 100 can determine the occurrence of the palletizing trigger, including the uniform layer trigger, the time limit trigger, the storage capacity trigger, or receiving the placement initiation command. For example, the robotic system 100 can check for the occurrence of the palletizing trigger after each of the available packages 362 has been stored in the storage area 705 and/or the simulated stacking plan has been updated. In one embodiment, the robotic system 100 can determine that the palletizing trigger has occurred when the robotic system receives the placement initiation command, which can be form a source external from the robotic system 100, such as the system user.

In another embodiment, the robotic system 100 can determine the occurrence of uniform layer trigger based on evaluation of the simulated stacking plan. For example, the robotic system 100 can evaluate the simulated stacking plan (such as for one or more of the package groupings) and determine that the uniform layer trigger has occurred when the simulated stacking plan has achieved the uniform package layer that meets the stacking surface area requirement.

In a further embodiment, the robotic system 100 can determine the occurrence of the time limit trigger based on the unit operation time. For example, the robotic system 100 can monitor the unit operation time and determine that the time limit trigger has occurred according to a determination that of unit operation time, such as the unit idle time for and/or the total operation time of the transfer unit 104, exceeding the time limit threshold.

In yet a further embodiment, the robotic system 100 can determine the occurrence of the storage capacity trigger based on the storage capacity counter. For example, the robotic system 100 can monitor the storage capacity counter and determine that the storage capacity trigger has occurred according to a determination of the storage capacity counter for the storage area 507 exceeding the storage capacity threshold.

At determination block 908, if the robotic system 100 determines the occurrence of the palletization trigger as the uniform layer trigger, the process can proceed to block 910 to place the available packages 362 on the task location 116 according to the simulated stacking plan that has achieved the uniform package layer. In some embodiments, further to the determination at the block 908, the robotic system 100 can delay proceeding to the block 910 for placement of the available packages 362.

For example, the robotic system 100 can delay placement of the available packages 362 in the situation where the simulated stacking plan for one of the package groupings has achieved the uniform packing layer while the simulated stacking plan for additional instances of the packing groups are approaching the stacking surface area requirement (referred to as the incomplete uniform packing layer). In particular, the robotic system 100 can delay proceeding to the block 910 if the sum of the package weights for the available packages 362 in the simulated stacking plan of an incomplete instance of the uniform packing layer is greater (or expected to be greater) than that of the simulated stacking plan for the instance of the package groupings that has achieved the uniform packing layer meeting the stacking surface area requirement. As such, the robotic system 100 can prioritize placement of the available packages 362 according the package weight (i.e. placement of heavier packages closer to the placement area of the task location). In some embodiments, the robotic system 100 can delay proceeding to the block 910 until a different instance of the palletizing trigger has occurred (i.e. the time limit trigger, the storage capacity trigger, or receiving the placement initiation command) at which point, the process can proceed to block 910 to place the available packages 362 according to the simulated stacking plan that has achieved the uniform packaging layer meeting the stacking surface area requirement.

In the situation where the robotic system 100 determines that the occurrence of the palletization trigger as the time limit trigger, the storage capacity trigger, or receiving the placement initiation command, the process can proceed to block 909. At block 909, the robotic system 100 can generate the simulated stacking plan based as the remaining package plan. In one embodiment, the robotic system 100 can implement the simulation function to apply the method 600 of FIG. 6 to generate the simulated stacking plan as the stacking plan 500 of FIG. 5 based on the available packages 362 currently in the storage area 705 and according to the palletizing criterion. For example, the simulation function can be executed to generate a two-dimensional (2D) placement plan, wherein the 2D placement plan represents a 2D mapping of the one or more of the available packages 362 along a horizontal plane of the task location 116. To continue the example, the simulation function can be executed to generate the remaining package plan by converting multiple instances of the 2D placement plan into a three-dimensional (3D) mapping of the one or more packages, wherein the 3D mapping is representative of an arrangement of one or more of the available packages 362 in multiple layers on the task location 116, with each layer being above another layer and having a corresponding instance of the 2D placement plan. To further the example, generating the remaining package plan can include determining the stacking sequence ID for the available packages 362 based on the simulated stacking plan, where the stacking sequence ID is for identifying a placing order for the available packages 362 on the task location 362.

Generating the remaining package plan, for example, according to the palletizing criterion can include satisfying the volume packing efficiency and/or the expected number of packages while observing the maximum stackable height of the available packages 362. In some embodiments, the remaining package plan can be generated to place the remaining instances of the available packages 362 on existing layers of previously placed packages, such as the available packages 362 that have been placed as the uniform package layer.

At block 910, the robotic system 100 can implement a plan to place at least a portion of the available packages 362 in the storage area 705 on the target location 116 according to the simulated stacking plan, such as the simulated stacking plan that has achieved the uniform stacking layer meeting the stacking surface area requirement (e.g. via the block 906) or the simulated stacking plan generated as the remaining package plan (e.g. via the block 909). For example, the robotic system 100 can generate instructions for the transfer unit 104 to retrieve the packages from the storage area 705 and place them on the task location 116 according to the simulated stacking plan. The robotic system 100 can use the storage map to identify the available packages 362 and corresponding storage locations in the storage area 705. Details regarding the plan to place the available packages 362 on the target location 116 will be discussed in FIG. 10 below.

Following the placement of available packages 362 on the target location 116, at block 911, the robotic system 100 can update the storage map and/or the storage location counter to reflect the removal of the available packages 362 from the storage area 705. For example, the robotic system 100 can update the storage map to remove the entries (e.g. package ID, storage location information, package attributes, placement information, etc.) corresponding to the available packages 362 that have been removed from the storage are 705 (i.e. at the block 910), indicating that the storage location is now available for storage of new incoming instances of the available packages 362. Similarly, the robotic system 100 can update the storage location counter by reducing the current value of the storage location counter by the number of the available packages 362 that have been removed during implementation of the plan to place the available packages 362 on the task location (i.e. at the block 910).

Referring back to determination block 907, if the robotic system 100 does not determine the occurrence of the palletizing trigger, the robotic system 100 can proceed to block 902. At the block 902, the robotic system 100 can continue to process the available packages 362 that are next in the series at the start location 114.

At determination block 912, the robotic system 100 determines if there are any more of the packages available 362 for processing. If there are more of the available packages 362 to be received, the process 900 can proceed to block 902 where the available packages 362 that is next in the series or sequence can be processed. If there are no more packages to processed for placement on the platform 116, the process concludes.

In some embodiments, the operation of the belt conveyor 110 can be adjusted according to the status of the robotic system 100. For example, while the robotic system 100 is palletizing the available packages 362, such as transferring the package from the storage area 705 to the target area 116 (e.g., in block 910), and if there are more of the available packages 362 on the conveyor belt 110 to be processed, the conveyer belt 110 may have to be stopped or its speed may have to be reduced to allow the transfer unit 104 to move one or more of the available packages 362 from the storage area 705 to the target location 116. The conveyer belt 110 may automatically stop, e.g., if the package at the start location 114, i.e. the target object 112, is not collected by the transfer unit 104 for more than a specified duration, or in some embodiments, may be stopped or slowed down by the robotics system 100. In some embodiments, the robotic system 100 can implement a plan to regulate the speed for the conveyor belt 110 by generating instructions that controls (e.g., starts, stops, or adjusts) the speed of the conveyor belt 110.

Figure 10:
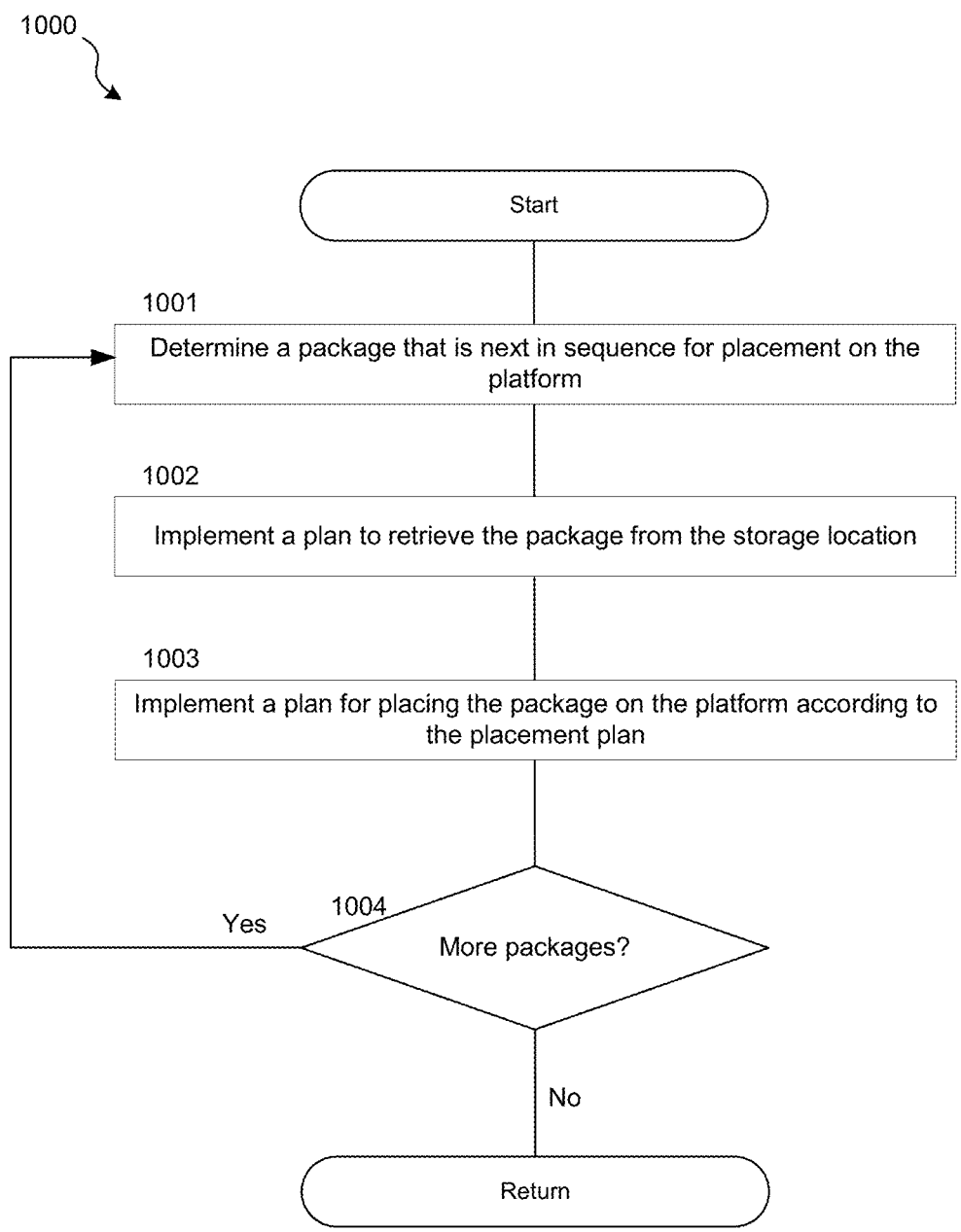
FIG. 10 is a flow diagram of a process for placement of the packages on a task location from a temporary storage area, consistent with various embodiments

FIG. 10 is a flow diagram of a process 1000 for placement of the packages on a task location from a storage area, consistent with various embodiments. In some embodiments, the process 1000 can be implemented in the environment of FIGS. 1 and 7, and as part of block 910 of FIG. 9. The process 1000 can commence following the determination of an occurrence of the palletizing trigger at the block 907 of FIG. 9.

At block 1001, the robotic system 100 can access the simulated stacking plan to determine the placement order of the available packages 362 according to the simulated stacking plan, such as the instance of the available packages 362 that is next in sequence for placement on the task location 116. For example, the robotic system 100 can determine the placement order for each of the available packages 362 according to the simulated stacking plan that has achieved the uniform packing layer as generated in block 906 or the simulated stacking plan as the remaining package plan as generated in block 909 of FIG. 9 (which can include the stacking sequence ID).

At block 1002, the robotic system 100 can implement a plan to retrieve the instance of the available packages 362 that is identified for placement (i.e. the identified package) onto the task location 116 (e.g. the platform) from the storage area 705. For example, the robotic system 100 can generate an instruction for the transfer unit 104 to retrieve the identified package from the storage area 705. The robotic system 100 can determine the storage location of the identified package in storage area 705 using the storage map and retrieve the identified package from the storage area 705 accordingly.

At block 1003, the robotic system 100 can implement a plan to place the identified package on the task location 116 according to the simulated stacking plan. For example, the robotic system 100 can implement the transfer unit 104 to retrieve the identified package from the storage area 705 and place the identified package on the task location 116 according to the stacking sequence ID.

At determination block 1004, the robotic system 100 can determine if there are any more of the available packages 362 in the simulated stacking plan that have not yet been placed on the task location 116. If there are more of the available packages 362 to be been placed on the task location 116, the process proceeds to block 1001 to retrieve the instance of the available packages 362 that is next in sequence according to the simulated stacking plan. If there are no more of the available packages 362 to be placed on the task location 116, the process concludes.

Conclusion

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method for operating a robotic system, the method comprising:
    determining dimension information representing physical dimensions of a package received at a start location for placement on a platform;
    implementing a plan for placing the package in a storage area different from the platform;
    generating or updating a simulated stacking plan for placing one or more packages currently stored in the storage area onto the platform;
    determining, following placement of the package in the storage area, the occurrence of at least one palletizing trigger, wherein the at least one palletizing trigger includes a storage capacity trigger indicating that a number of packages currently stored in the storage area exceeds a storage capacity threshold; and
    in response to determining the occurrence of the at least one palletizing trigger, implementing the simulated stacking plan.

2. The method of claim 1, wherein the at least one palletizing trigger further includes a uniform layer trigger indicating that the simulated stacking plan has achieved a uniform package layer that meets a stacking surface area requirement.

3. The method of claim 1, wherein the at least one palletizing trigger further includes a time limit trigger indicating that a unit idle time and/or a total operation time of the transfer unit has exceeded an operation time threshold.

4. The method of claim 1, wherein generating or updating the simulated stacking plan includes generating or updating the simulated stacking plan to achieve a uniform packing layer using the one or more packages such that a top surface the uniform package layer is of the same height.

5. The method of claim 1, wherein the at least one palletizing trigger further includes a placement initiation command trigger indicating that a placement initiation command has been received from a source external to the robotic system.

6. The method of claim 5, wherein generating or updating the simulated stacking plan includes generating or updating the simulated stacking plan for placement of every package currently in the storage area in response to determining the occurrence of the placement initiation command trigger.

7. The method of claim 4 further comprising:
    implementing a plan for regulating a speed of a conveyor unit,
    wherein the conveyor unit transports the package to the start location for placement on the platform.

8. The method of claim 4, wherein generating the simulated packing plan to achieve the uniform packing layer includes generating the uniform packing layer as a single layer of the one or more packages such that a package height of each of the one or more packages is the same.

9. The method of claim 4, wherein generating the simulated packing plan to achieve the uniform packing layer includes generating the uniform packing layer as a combination layer that includes a combination of a single unstacked package placed alongside a stack of two or more packages, wherein a package height of the single unstacked package is equivalent to a sum of package heights of the two or more packages in the stack.

10. The method of claim 4, wherein generating or updating the simulated stacking plan to achieve the uniform packing layer of the packages includes meeting a stacking surface area requirement.

11. The method of claim 10, wherein the stacking surface area requirement includes a combined area requirement that specifies a minimum combined horizontal area of the top surface of the uniform packing layer.

12. The method of claim 10, wherein the stacking surface area requirement includes a package spacing requirement that specifies a maximum spacing between packages forming the top surface of the uniform packing layer.

13. The method of claim 1, wherein the one or more packages include all of the packages currently stored in the storage area, and wherein generating or updating the simulated stacking plan includes generating or updating the simulated stacking plan (i) upon determining the occurrence of the storage capacity trigger and (ii) according to a palletizing criterion.

14. The method of claim 13, wherein the palletizing criterion includes a volumetric packing efficiency for placing the packages on the platform.

15. The method of claim 13, wherein the palletizing criterion includes an expected number of the packages for placing the packages on the platform.

16. The method of claim 13, wherein the palletizing criterion includes a maximum stackable height for placing the packages on the platform.

17. The method of claim 13, wherein generating or updating the simulated stacking plan includes:
  generating or updating a two-dimensional (2D) placement plan, wherein the 2D placement plan represents a 2D mapping of the one or more packages along a horizontal plane of the platform, and
  converting multiple instances of the 2D placement plan into a three-dimensional (3D) mapping of the one or more packages, wherein the 3D mapping is representative of an arrangement of the one or more packages in multiple layers on the platform, each layer being above another layer and having a corresponding instance of the 2D placement plan.

18. The method of claim 17 further comprising:
  determining a stacking sequence identification (ID) for each of the one or more packages based on the simulated stacking plan, wherein the stacking sequence ID is for identifying a placing order for each of the one or more packages on the platform,
  wherein implementing the simulated packing plan includes placing each of the one or more packages on the platform according to a respective stacking sequence ID.

19. A tangible, non-transient computer-readable storage medium storing computer-readable instructions, the instructions comprising:
  instructions for determining dimension information representing physical dimensions of a package received at a start location for placement on a platform,
  instructions for implementing a plan for placing the package in a storage area separate from the platform,
  instructions for updating or generating a simulated stacking plan for placing one or more packages currently stored in the storage area onto the platform;
  instructions for determining, following placement of the package in the storage area, the occurrence of a palletizing trigger, wherein the palletizing trigger includes a storage capacity trigger that indicates that a number of packages currently stored in the storage area exceeds a storage capacity threshold; and
  instructions for implementing the simulated stacking plan based at least in part on the occurrence of the palletizing trigger.

20. A robotic system comprising:
  at least one processor; and
  at least one memory device connected to the at least one processor and having stored thereon instructions executable by the processor to:
    determine dimension information representing physical dimensions of a package received at a start location for placement on a platform,
    implement a plan for placing the package in a storage area different than the platform,
    generate or update a simulated stacking plan for placing one or more packages currently stored in the storage area onto the platform,
    determine, following placement of the package in the storage area, the occurrence of a palletizing trigger, wherein the palletizing trigger includes a storage capacity trigger that indicates that a number of packages currently stored in the storage area exceeds a storage capacity threshold; and
    in response to determining the occurrence of the palletizing trigger, implement the simulated stacking plan.

* * * * *